US011142956B2

(12) United States Patent
Batarseh

(10) Patent No.: US 11,142,956 B2
(45) Date of Patent: Oct. 12, 2021

(54) LASER TOOL CONFIGURED FOR DOWNHOLE MOVEMENT

(71) Applicant: Saudi Arabian Oil Company, Dhahran (SA)

(72) Inventor: Sameeh Issa Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 288 days.

(21) Appl. No.: 16/173,308

(22) Filed: Oct. 29, 2018

(65) Prior Publication Data

US 2020/0131854 A1  Apr. 30, 2020

(51) Int. Cl.
| | |
|---|---|
| *E21B 7/15* | (2006.01) |
| *E21B 7/06* | (2006.01) |
| *E21B 7/04* | (2006.01) |
| *B23K 26/142* | (2014.01) |
| *B23K 26/21* | (2014.01) |
| *B23K 26/00* | (2014.01) |

(Continued)

(52) U.S. Cl.
CPC ............ *E21B 7/15* (2013.01); *B23K 26/0006* (2013.01); *B23K 26/032* (2013.01); *B23K 26/0648* (2013.01); *B23K 26/0652* (2013.01); *B23K 26/0673* (2013.01); *B23K 26/073* (2013.01); *B23K 26/0884* (2013.01); *B23K 26/142* (2015.10); *B23K 26/21* (2015.10); *E21B 7/06* (2013.01); *E21B 29/02* (2013.01); *E21B 7/04* (2013.01); *E21B 41/0035* (2013.01)

(58) Field of Classification Search
CPC .................................. E21B 7/15; B23K 26/00
See application file for complete search history.

(56) References Cited

U.S. PATENT DOCUMENTS

| 6,755,262 B2 | 6/2004 | Parker |
|---|---|---|
| 6,888,097 B2 | 5/2005 | Batarseh |

(Continued)

FOREIGN PATENT DOCUMENTS

| CN | 203081295 U | 7/2013 |
|---|---|---|
| CN | 203334954 U | 12/2013 |

(Continued)

OTHER PUBLICATIONS

International Search Report for PCT/IB2019/050074, 6 pages (dated Jun. 26, 2019).

(Continued)

*Primary Examiner* — Robert E Fuller
*Assistant Examiner* — Lamia Quaim
(74) *Attorney, Agent, or Firm* — Charles E. Lyon; Mehdi Hajizadegan; Peter A. Flynn

(57) ABSTRACT

An example system includes a laser tool configured for downhole movement. The laser tool includes an optical assembly configured to shape a laser beam for output. The laser beam may have an optical power of at least one kilowatt (1 kW). A housing contains the optical assembly. The housing is configured for movement to direct the output laser beam within a wellbore. The movement includes rotation of the laser tool around a longitudinal axis of the housing and tilting the housing relative to a longitudinal axis of the wellbore. A control system is configured to control at least one of the movement of the housing or an operation of the optical assembly to direct the output laser beam within the wellbore.

22 Claims, 17 Drawing Sheets

(51) Int. Cl.
   *B23K 26/03* (2006.01)
   *B23K 26/06* (2014.01)
   *B23K 26/067* (2006.01)
   *B23K 26/073* (2006.01)
   *B23K 26/08* (2014.01)
   *E21B 29/02* (2006.01)
   *E21B 41/00* (2006.01)

(56) References Cited

U.S. PATENT DOCUMENTS

| | | |
|---|---|---|
| 9,217,291 B2 | 12/2015 | Batarseh |
| 9,353,612 B2 | 5/2016 | Batarseh |
| 9,492,885 B2 | 11/2016 | Zediker et al. |
| 9,644,464 B2 | 5/2017 | Batarseh |
| 9,932,803 B2 | 4/2018 | Batarseh et al. |
| 9,939,421 B2 | 4/2018 | Batarseh et al. |
| 10,053,959 B2 | 8/2018 | Ayub et al. |
| 10,094,172 B2 | 10/2018 | Wang et al. |
| 2004/0206505 A1 | 10/2004 | Batarseh |
| 2006/0102343 A1 | 5/2006 | Skinner et al. |
| 2006/0114311 A1* | 6/2006 | Chen ............... B23B 49/00 347/238 |
| 2012/0074110 A1 | 3/2012 | Zediker et al. |
| 2014/0360778 A1* | 12/2014 | Batarseh ............ E21B 7/046 175/17 |
| 2015/0021008 A1 | 1/2015 | Batarseh |
| 2015/0021013 A1 | 1/2015 | Batarseh |
| 2016/0069857 A1 | 3/2016 | Batarseh et al. |
| 2016/0160618 A1 | 6/2016 | Batarseh et al. |
| 2016/0326839 A1 | 11/2016 | Ayub et al. |
| 2017/0074447 A1 | 3/2017 | Batarseh et al. |
| 2017/0130570 A1 | 5/2017 | Al-Nakhli et al. |
| 2018/0163524 A1 | 6/2018 | Batarseh |
| 2018/0266226 A1 | 9/2018 | Batarseh et al. |
| 2018/0270920 A1 | 9/2018 | Batarseh |
| 2019/0100992 A1* | 4/2019 | Glasgow, Jr. ........... E21B 47/14 |

FOREIGN PATENT DOCUMENTS

| | | |
|---|---|---|
| WO | WO-2015/088553 A1 | 6/2015 |
| WO | WO-2020/089697 A1 | 5/2020 |

OTHER PUBLICATIONS

Written Opinion for PCT/IB2019/050074, 9 pages (dated Jun. 26, 2019).

Written Opinion of the International Preliminary Examining Authority for PCT/IB2019/050074, 7 pages (dated Oct. 16, 2020).

International Preliminary Report on Patentability for PCT/IB2019/050074, 24 pages (dated Feb. 19, 2021).

* cited by examiner

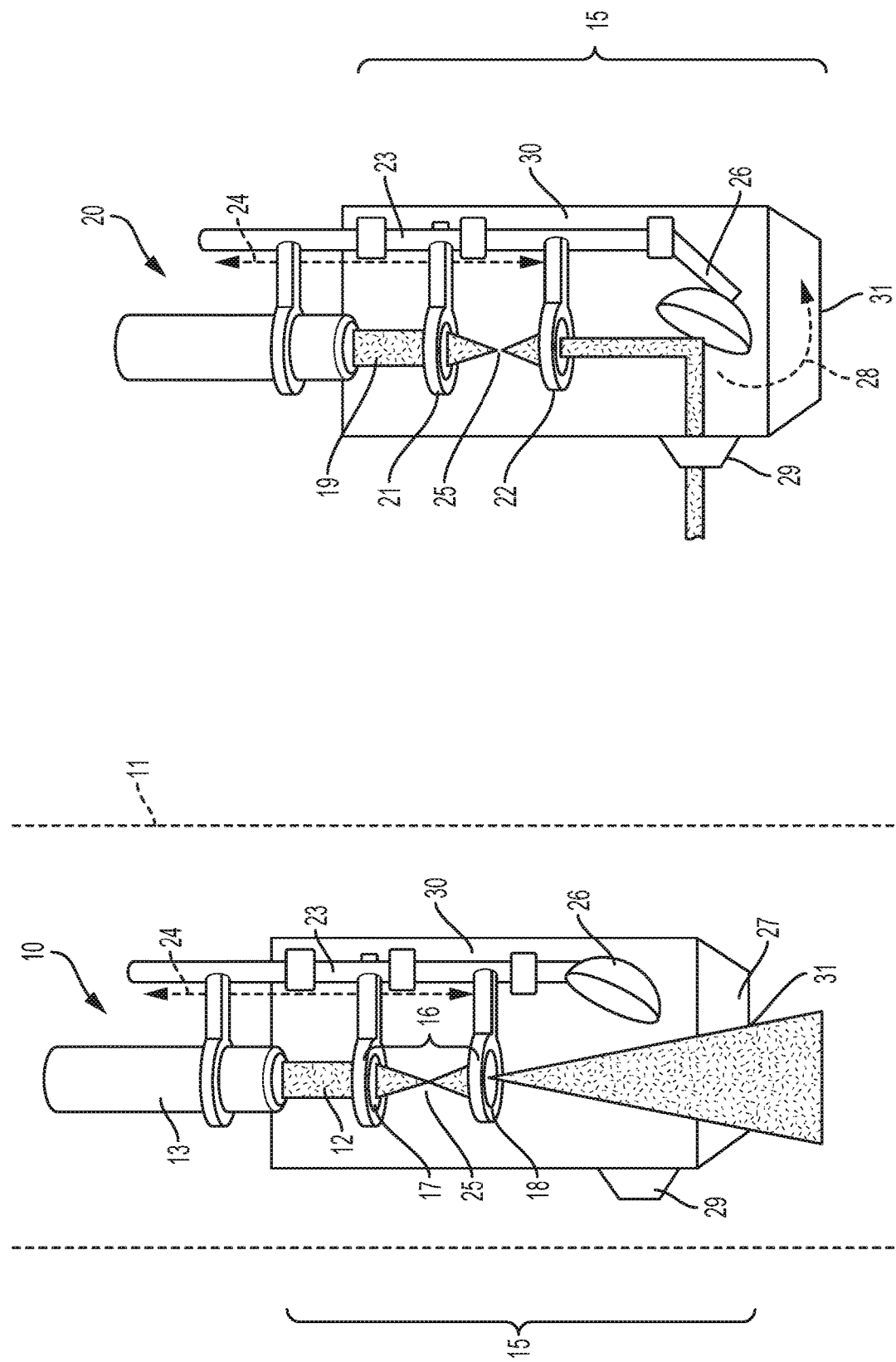

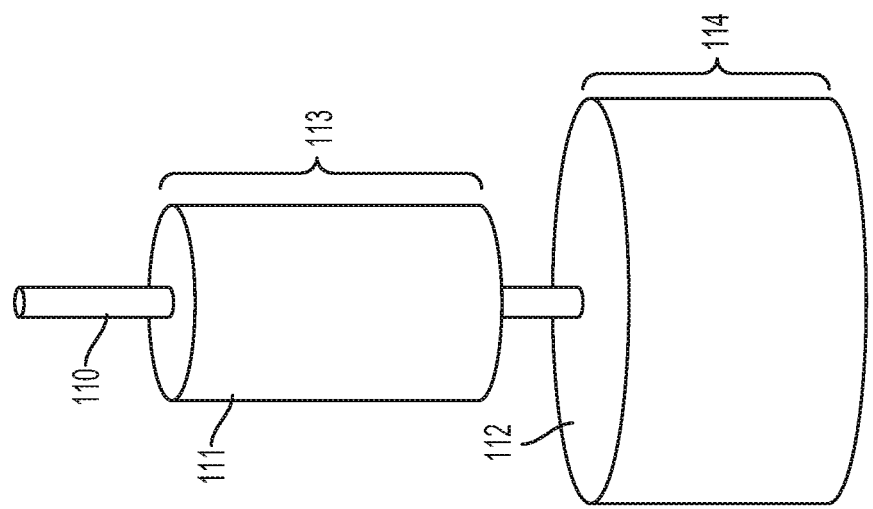
FIG. 14
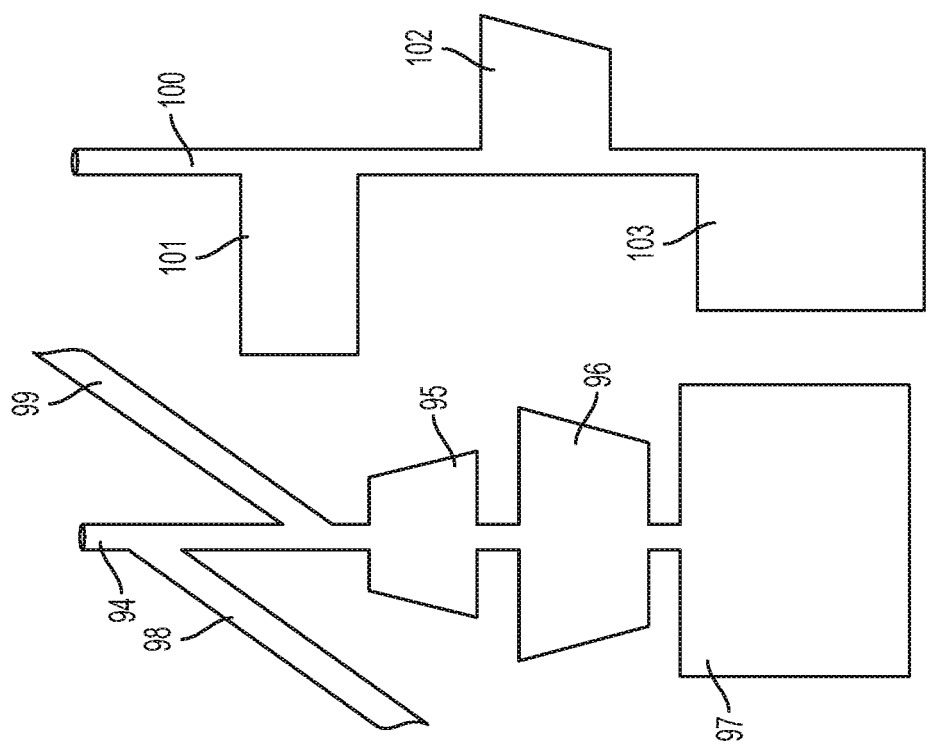
FIG. 13
FIG. 12
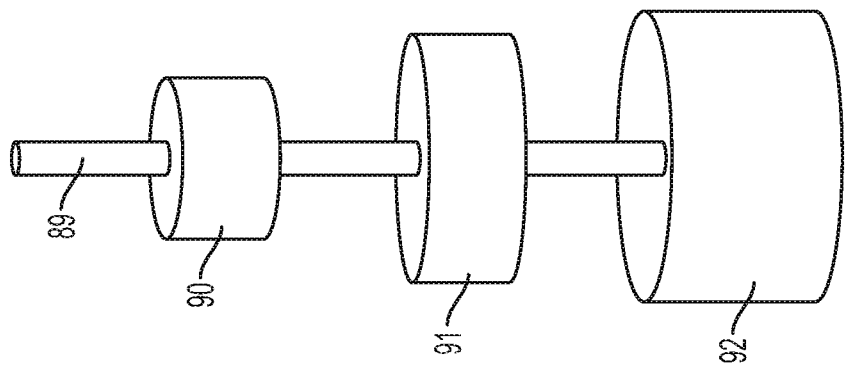
FIG. 11

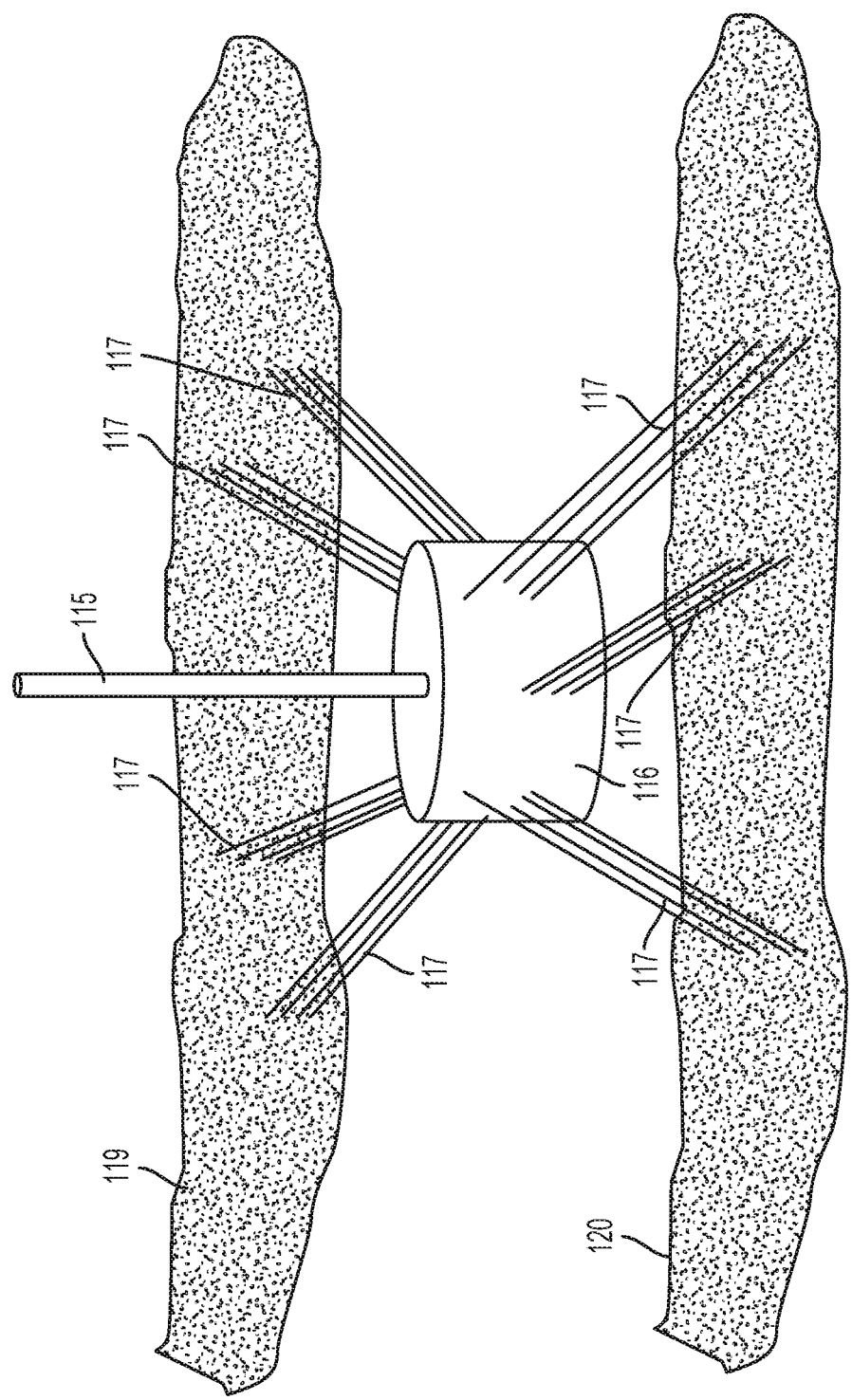

LASER TOOL CONFIGURED FOR DOWNHOLE MOVEMENT

TECHNICAL FIELD

This specification describes examples of laser tools configured for downhole movement such as rotation and tilting.

BACKGROUND

A laser tool may be used to output a laser beam within a wellbore. The laser beam may be used in a number of applications such as extending or expanding a wellbore. In an example operation, a laser tool is lowered downhole. The laser tool outputs a laser beam targeting a wall of the wellbore. Heat from the laser beam breaks or sublimates rock or other structures that form the wall.

SUMMARY

An example system includes a laser tool configured for downhole movement. The laser tool includes an optical assembly configured to shape a laser beam for output. The laser beam may have an optical power of at least one kilowatt (1 kW). A housing contains the optical assembly. The housing is configured for movement to direct the output laser beam within a wellbore. The movement includes rotation of the laser tool at least partly around a longitudinal axis of the housing and tilting the housing relative to a longitudinal axis of the wellbore. A control system is configured to control at least one of the movement of the housing or an operation of the optical assembly to direct the output laser beam within the wellbore. The example system may include one or more of the following features either alone or in combination.

The shaping performed by the optical assembly may include focusing the laser beam, collimating the laser beam, or spreading the laser beam. The optical assembly may include a first lens in a path of the laser beam and a second lens in the path of the laser beam. The second lens is downstream from the first lens in the path of the laser beam. The first lens may be a focusing lens to focus the laser beam. The second lens may be a collimating lens to receive the laser beam from the focusing lens and to collimate the laser beam. The second lens may be a diverging lens to receive the laser beam from the focusing lens and to cause the laser beam to spread. An adjustment mechanism is configurable to change a distance between the first lens and the second lens. The adjustment mechanism may include an adjustable rod to move the first lens along the path of the laser beam. The adjustment mechanism may be controlled by the control system.

The optical assembly may also include a beam director that is movable into or out of the path of the laser beam. The beam director may be downstream from the first lens in the path of the laser beam. The beam director changes the path of the laser beam and is controllable by the control system. The beam director may include at least one of a mirror, a beam splitter, or a prism.

The housing may include a purging port for outputting a purging medium. A rotational structure having fins that are rotatable may force the purging medium into the housing. The purging media may include an inert gas or a liquid.

The system may include an acoustic camera on the housing to capture images or video during operation of the laser tool. The system may include one or more environmental sensors to sense environmental conditions within the wellbore during operation of the laser tool.

An example method of operating a laser tool includes lowering the laser tool downhole in a vertical wellbore. The laser tool is configured to output a laser beam within the wellbore. At least part of the laser tool is tilted within the vertical wellbore to direct the laser beam to a wall in the wellbore to form an inclined wellbore to a hydrocarbon deposit. Hydrocarbons are extracted through the inclined wellbore. The example method may include one or more of the following features either alone or in combination.

At least part of the laser tool may be rotated within the vertical wellbore to form the inclined wellbore. The hydrocarbon deposit may be above a water deposit. Water may be extracted from the water deposit via the vertical wellbore. The water may be extracted via a second vertical wellbore that is separate from the vertical wellbore The hydrocarbon deposit may include gas above a liquid deposit. Liquid may be extracted from the liquid deposit via the vertical wellbore. The liquid may include oil and water. The liquid may be extracted by a pump that is located downhole within the vertical wellbore. The gas may flow through the inclined wellbore and bypass the pump. As a result, the efficiency of the pump may be increased.

An example method of operating a laser tool includes lowering the laser tool downhole in a first inclined wellbore. The laser tool is configured to output a laser beam within the wellbore. The method includes tilting at least part of the laser tool within the first inclined wellbore to direct the laser beam to a wall in the first inclined wellbore to form a second inclined wellbore to a hydrocarbon well. The method also includes tilting at least part of the laser tool within the first inclined wellbore to direct the laser beam to a wall in the first inclined wellbore to form a third inclined wellbore to a water wall. Hydrocarbons are extracted via the second inclined wellbore. Water is extracted via the third inclined wellbore. The example method may include one or more of the following features either alone or in combination.

The second inclined wellbore may connect to a first vertical wellbore. The third inclined wellbore may connect to a second vertical wellbore. The hydrocarbons may be extracted also via the first vertical wellbore. The water may be extracted also via the second vertical wellbore. A mixture of the hydrocarbons and the water may be extracted via the first inclined wellbore and may separate at the second inclined wellbore and the third inclined wellbore so that the hydrocarbons are extracted via the second inclined wellbore and the first vertical wellbore and so that the water is extracted via the third inclined wellbore and the second vertical wellbore.

An example system includes multiple laser tools that are connectable. Each of the multiple laser tools is for use at a different depth within a wellbore. Each of the multiple laser tools includes an optical assembly configured to shape a laser beam for output and a housing that contains the optical assembly. The housing is configured for movement to direct the output laser beam within the wellbore. The movement includes rotation of the housing around a longitudinal axis of the housing and tilting the housing relative to the longitudinal axis. A control system controls movement of each housing of the multiple laser tools.

An example method includes moving a laser tool into a wellbore through a hydrocarbon-bearing formation. The laser tool is for outputting a laser beam within the wellbore. The method also includes operating the laser tool within the wellbore to cause the laser beam to extract rock to form a void in the hydrocarbon-bearing formation. The void has a shape that enables separation of mixtures or emulsions within the wellbore. The mixtures or emulsions include some or all of hydrocarbon liquids, hydrocarbon gases, or aqueous fluids. The example method may include one or more of the following features either alone or in combination.

Separation of the mixtures or emulsions may be based on densities of the mixtures or emulsions. Operating the laser tool may include tilting at least part of the laser tool within the wellbore to form the void, rotating at least part of the laser tool within the wellbore to form the void, or both rotating and tilting at least part of the laser tool within the wellbore to form the void. The mixtures or emulsions may include oil and water. The shape may enable separation of the mixtures or emulsions downhole due to an increase in a volume of the wellbore caused by the void.

An example method includes identifying an object that is to be welded within a wellbore and moving a laser tool into a position within the wellbore to perform welding. The method also includes operating the laser tool within the wellbore to direct a laser beam toward the object to perform welding at the object. Operating the laser tool includes rotating the laser tool at least partly around a longitudinal axis of a housing of the laser tool and tilting the housing relative to a longitudinal axis of the wellbore. The example method may include one or more of the following features either alone or in combination.

The object may include casing that lines the wellbore. The welding may include liquefying metal at a location on the object. The metal may be part of the object. The metal may include filler that is separate from the object. Operating the laser tool may include shaping the laser beam prior to directing the laser beam toward the object. Shaping the laser beam may include collimating or focusing the laser beam.

Any two or more of the features described in this specification, including in this summary section, may be combined to form implementations not specifically described in this specification.

At least part of the systems and processes described in this specification may be controlled by executing, on one or more processing devices, instructions that are stored on one or more non-transitory machine-readable storage media. Examples of non-transitory machine-readable storage media include, but are not limited to, read-only memory, an optical disk drive, memory disk drive, and random access memory. At least part of the systems and processes described in this specification may be controlled using a computing system comprised of one or more processing devices and memory storing instructions that are executable by the one or more processing devices to perform various control operations.

The details of one or more implementations are set forth in the accompanying drawings and the description. Other features and advantages will be apparent from the description, the drawings, and the claims.

DESCRIPTION OF THE DRAWINGS

FIGS. 1 and 2 are cut-away side views of examples laser tools.

FIGS. 11 to 14 show example wellbore shapes formed using a laser tool.

FIG. 15 shows an example use of a laser tool to create inclined wellbores leading to hydrocarbon deposits within a rock formation.

Like reference numerals in the figures indicate like elements.

DETAILED DESCRIPTION

Figure 3:
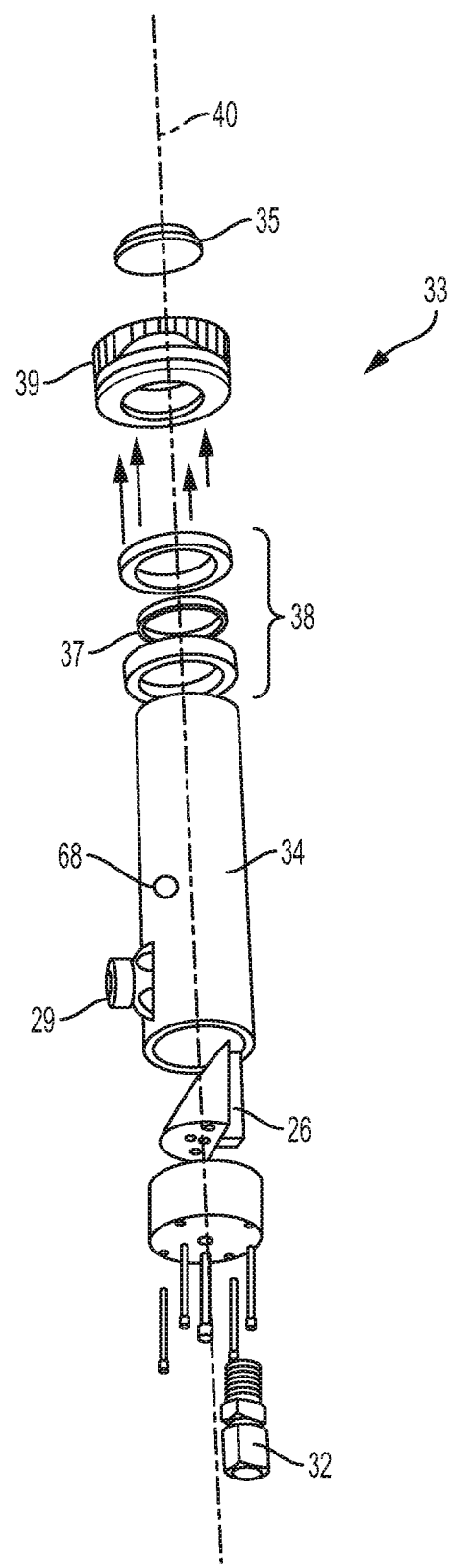
FIG. 3 is an exploded view of an example laser tool.

This specification describes examples of laser tools for ablating structures located downhole such as rock formations, casing, and debris. An implementation of the laser tool includes an optical assembly configured to shape a laser beam for output. For example, the optical assembly may contain lenses, mirrors, prisms, or other optics to focus the laser beam, to collimate the laser beam, or to spread the laser beam. A housing contains the optical assembly and provides output ports for the laser beam. The housing is configured for movement to direct the output laser beam within a wellbore. The movement includes rotation of the housing around its own longitudinal axis and tilting the housing relative to a longitudinal axis of the wellbore. Rotation of the housing around its own longitudinal axis is also referred to as spinning. During operation, the laser beam may be directed downhole to form a wellbore or to extend an existing wellbore. The laser beam may also be directed to a wall of the wellbore to form an intersecting wellbore such as an inclined wellbore that branches off from the main wellbore. An inclined wellbore includes wellbores that are non-vertical and that extend from the main wellbore toward the surface or away from the surface. The laser beam may also be directed to the wall of the wellbore to expand the diameter of the existing wellbore or to change a cross-sectional shape of the existing wellbore.

A control system is configured—for example, programmed—to control movement of at least part of the laser tool to cause the laser beam to move within the wellbore. For example, the control system may be configured to control movement of the housing, such as tilting or rotating the housing, or to control an operation of the optical assembly to affect the output of the laser beam within the wellbore. For example, the laser tool may be controlled to move circularly to target the bottom of the wellbore. For example, the laser tool may be controlled to rotate at least partly around a longitudinal axis of the housing in order to target a circumference of the wellbore. For example, the laser tool may be controlled to move along the longitudinal axis of the wellbore in order to target a linear segment of the wellbore. For example, the laser tool may be controlled both to rotate around the longitudinal axis of the housing and to move through the wellbore in order to target a circumference of the wellbore that extends along the longitudinal axis. The laser tool may be configured to direct the laser beam parallel to the surface or at an inclined angle that is not parallel to the surface.

The laser tool may also include one or more sensors to monitor environmental conditions in the wellbore and to output signals indicative of the environmental conditions. Examples of the sensors may include temperature sensors to measure temperature downhole, pressure sensors to measure pressure downhole, and vibration sensors to measure vibrations levels downhole. Other sensors may also be used, such as acoustic sensors. An example of an acoustic sensor includes an acoustic camera that generates images based on acoustic signals reflected or emitted from a rock formation. Signals received from the sensors may indicate that there are problems inside the wellbore or that there are problems with the laser tool. A drilling engineer may take corrective action based on these signals. For example, if a temperature or pressure downhole is such that equipment like the laser tool may be damaged, that equipment may be withdrawn from the wellbore.

FIG. 1 shows components of an example laser tool 10 of the type described in the preceding paragraphs. At least part of laser tool 10 is located within wellbore 11. In this example, wellbore 11 passes through a hydrocarbon-bearing rock formation that includes various materials, such as limestone, shale, or sandstone.

Laser tool 10 may be lowered downhole using a coiled tubing unit or a wireline. Laser tool 10 receives a laser beam 12 from a laser generator ("generator") via a fiber optic cable 13. An example generator is a direct diode laser. Direct diode lasers include laser systems that use the output of laser diodes directly in an application. This is in contrast to other types of lasers in which the output of laser diodes is used to pump another laser to generate an output. Examples of direct diode lasers include systems that generate straight-line beam shapes. A straight-line beam shape includes lasers that travel directly from one point to another. A straight-line beam shape also includes lasers having a diameter that stays the same or that changes during travel. Accordingly, in some straight-line beam shaped lasers, that the axis of the laser beam does not deviate but the width of the beam itself may change. Example lasers that may be used include ytterbium lasers, erbium lasers, neodymium lasers, dysprosium lasers, praseodymium lasers, thulium lasers, carbon dioxide lasers, and neodymium-doped yttrium aluminum garnet (YAG) lasers.

The generator may be located at the surface of the well, for example, at the wellhead. In this case, the laser beam may be transmitted downhole to the laser tool using an optical transmission medium such as fiber optic cable. In some implementations, all or part of the generator may be located within the wellbore. For example, the generator may be within the housing of the laser tool.

In some implementations, the laser beam has an optical power that is within a range of 0.1 kilowatts (kW) to 100 kW. In some implementations, the laser beam has an optical power of 1 kW and has an intensity of 5 kW/cm$^2$ (kW per centimeter squared). In some implementations, the laser beam has a diameter that is within a range of 0.25 inches (6.35 millimeters (mm)) to 2.0 inches (50.8 mm).

Optical assembly 15 is configured to receive the laser beam from fiber optic cable 13 and to direct the laser beam toward a rock formation or other target. In this example, optical assembly 15 includes two lenses: first lens 17 and second lens 18. Each lens 17 and 18 is configured—for example, shaped, arranged, or both shaped and arranged—to change the shape of the laser beam. For example, first lens 17 may focus the laser beam, collimate the laser beam, or spread the laser beam. Spreading includes causing the laser beam to diverge. For example, the second lens 18 may focus the laser beam, collimate the laser beam, or spread the laser beam.

In the example of FIG. 1, first lens 17 focuses laser beam 12 and second lens 18 spreads laser beam 12. In example laser tool 20 of FIG. 2, first lens 21 focuses laser beam 19 and second lens 22 collimates laser beam 19. The remaining components of laser tool 20 are the same as those of laser tool 10. As described subsequently, the optical assembly may include one or more cover lenses to protect the remainder of the optical assembly and any other vulnerable structures that may be present with the housing of the laser tool. The cover lens need not affect the size or shape of the laser beam and may simply pass the laser beam unchanged.

The optical assembly may include an adjustment mechanism to change a distance 16 between the first lens and the second lens. The adjustment mechanism is controllable by the control system to change the distance. In the examples of FIGS. 1 and 2, the adjustment mechanism includes an adjustable rod 23 to move the first lens along the path of the laser beam in the directions of arrow 24. In this example, movement of the first lens affects where the focal point 25 is located. This change in focal point location changes the cross-sectional area of the laser beam that impacts second lens 18, 22. This affects the output of the second lens. For example, in FIG. 2, the change in focal point may affect the diameter of the collimated beam. The adjustment mechanism may be set before the laser tool is lowered downhole or the adjustment mechanism may be adjusted while the laser tool is downhole.

Optical assembly 15 also includes a beam director 26 to receive a laser beam from second lens 18 or 22 and to direct the laser beam at an angle toward other optics in the optical assembly. Examples of beam directors include a mirror, a prism, and a beam splitter. The beam director is movable into and out of the path of the laser beam to change the direction of the laser beam or part of the laser beam. In the example of FIG. 1, beam director 26 is out of the path of laser beam 12 and therefore does not affect the direction of the laser beam. Accordingly, in this example the laser beam is output from the bottom 27 of laser tool 10. In the example of FIG. 2, beam director 26 is in the path of laser beam 19 and therefore affects the direction of the laser beam. In this example, the beam director is a mirror and the laser beam is directed so that it is angled at about ninety degrees (90°) relative to its original path. In some implementations, the beam director is movable to any point along arc 28, for example, to output the laser beam over a range of angles. A control system of the type described in this specification may control positioning of the beam director.

In the examples of FIGS. 1 and 2, laser tool 10, 20 each includes a side output port 29 on housing 30. Side output port 29 may include a fiber optic medium to transmit the laser beam from the inside of housing 30 to the outside of housing 30. As shown in FIG. 2, the laser beam may be directed to output port 29 by beam director 26. From there, the laser beam is output to its target. In these examples, the laser tool also includes a bottom output port 31 on its housing. The example of FIG. 1 shows beam director 26 fully retracted and the laser beam exiting housing 30 through bottom port 31.

FIG. 3 shows an exploded view 33 of an example laser tool. The components of FIG. 1 or 2 may be contained within housing 34. Side port 29 and beam director 26 are shown. Housing 34 may be the same as housing 30 of FIGS. 1 and 2. Housing 34 may be made of metal, plastic, composite, or other rigid material. In some examples, a rigid material includes a material that is not flexible. A fiber optic medium, such as fiber optic cable (not shown in FIG. 3), extends from the generator (not shown in FIG. 3) and into housing 34 to deliver the laser beam as shown in FIGS. 1 and 2. A top cover 35 protects the contents of housing 34 from wellbore debris.

As shown in FIG. 3, the optical assembly also includes cover lens 37. The cover lens fits inside housing 34 and may be held in place by rings 38.

A rotational device 39, which is referred to as a spinner, may also be part of the laser tool. The rotational device may be located inside of housing 34 or outside of housing 34. The rotational device may be a hydraulically-operated device or an electrically-operated device such as motor that is physically connected to the remainder of the laser tool and that enables rotation of at least part of the laser tool around longitudinal axis 40 of housing 34. For example, the rotational device may enable rotation of the housing and its contents around longitudinal axis 40.

In some implementations, the rotational device also includes fins or grooves that rotate to force purging medium into and through the housing. The control system may control the rotation to control the flow of purging medium through the housing. The purging medium may cool the laser tool and remove debris and other materials from the laser tool. A purging port 32 may be located at a bottom part of the laser tool near to the bottom port. Purging medium forced through the laser tool exits through the purging port 32. In some implementations, the purging media can be or include a non-reactive, non-damaging gas such as nitrogen or a liquid such as halocarbon. A halocarbon includes a compound such as a chlorofluorocarbon that includes carbon combined with one or more halogens. Examples of halocarbon include halocarbon-oil having viscosities in a range from 0.8 centipoise (cP) to 1000 cP at 100 degrees)(°) Fahrenheit (37.8° Celsius). In some implementations, purging may be cyclical. For example, purging may occur only while the laser beam is operational.

Figure 6:
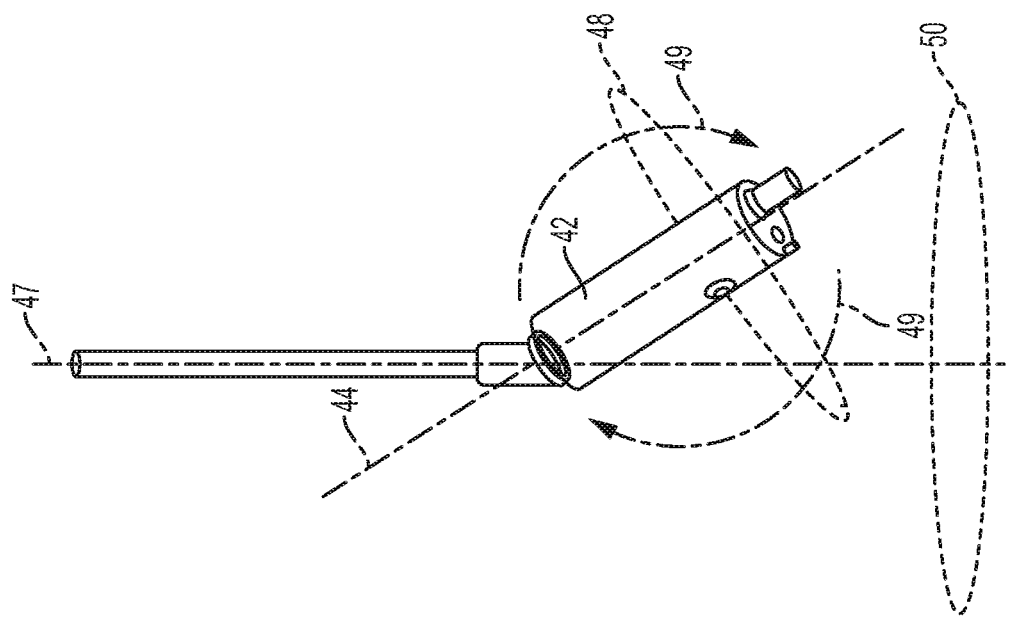
FIG. 6 shows both rotation and tilting of a laser tool.
Figure 5:
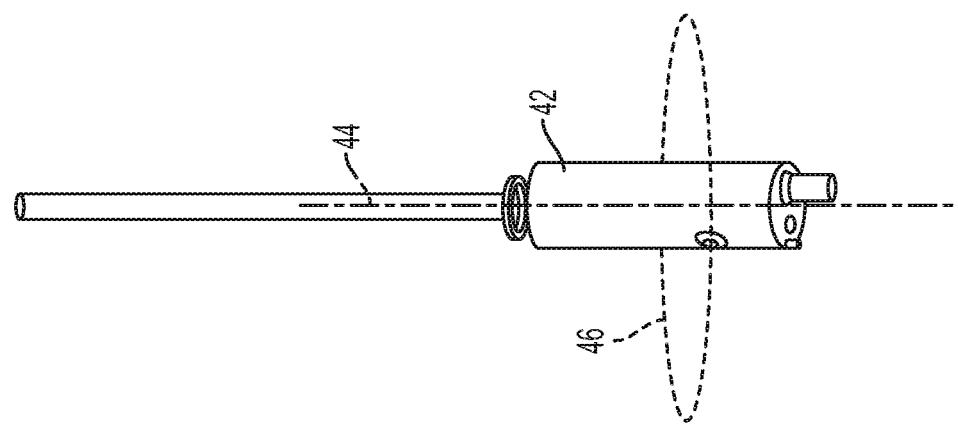
FIG. 5 shows complete rotation of a laser tool.
Figure 4:
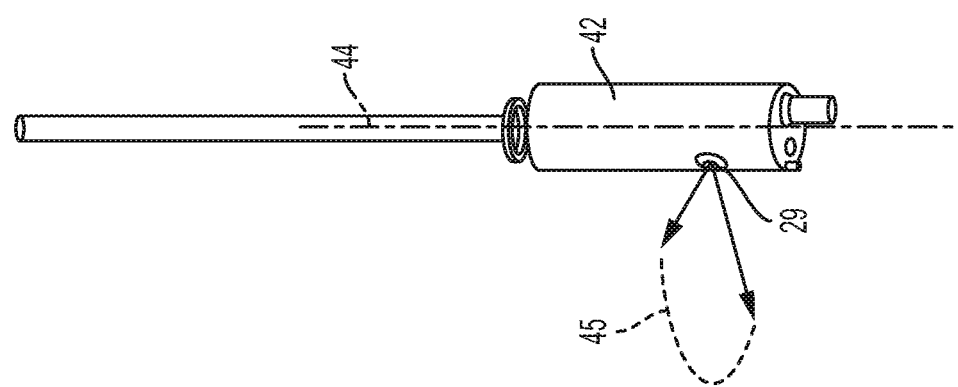
FIG. 4 shows partial rotation of a laser tool.

Referring to FIGS. 4, 5, and 6, an example laser tool 42 of the type shown in FIG. 1, 2, or 3 may be lowered downhole using operational equipment such as coiled tubing or a wireline. The laser tool may be mounted on the operational equipment to enable rotation of the housing around a longitudinal axis of the housing, to enable tilting the housing relative to a longitudinal axis of the wellbore, to enable rotation of the housing around the longitudinal axis of the housing while tilted relative to the longitudinal axis of the wellbore, and to enable rotation of the housing around the longitudinal axis of the housing while tilted and while simultaneously also rotating around the longitudinal axis of the wellbore.

In an example, FIG. 4 shows laser tool 42 mounted to enable at least partial rotation around longitudinal axis 44 of housing 42. Partial rotation is depicted by arc 45. This partial rotation allows walls of the wellbore to be shaped by the laser beam via side port 29. Likewise, the bottom of the wellbore may be shaped via the bottom port described previously. The bottom of the wellbore may be referred to as the "face" of the wellbore or the "toe" for horizontal wellbores. In an example, FIG. 5 shows laser tool mounted 42 to enable full rotation—for example, 360° rotation—around longitudinal axis 44 of housing 42. Full rotation is depicted by circle 46. This full rotation allows the entire inner circumference of the wellbore to be shaped by the laser beam via the side port. Likewise, the bottom of the wellbore may be shaped via the bottom port. In an example, FIG. 6 shows laser tool 42 mounted to enable rotation around longitudinal axis 44 of housing 42 and tilting relative to longitudinal axis 47 of the wellbore. Tilting may be in a range of motion from 1° off of the longitudinal axis to 90° or more. The rotation may be partial or complete. Rotation is depicted by circle 48 and tilting is depicted by arrows 49. The combination of rotation and tilting allows the laser beam selectively to target various parts of the wellbore including the walls of the wellbore and the bottom of the wellbore. In addition, while tilted and while rotating around longitudinal axis 44, the laser tool including its housing may also rotate simultaneously around longitudinal axis 47 of the wellbore. This rotation is depicted using circle 50.

Tilting the laser tool may position the bottom port to output the laser beam toward the wall of a main wellbore to form an inclined wellbore that branches-off of the main wellbore. Tilting the laser tool may position the side port to output the laser beam toward the wall of a main wellbore to form an inclined wellbore that branches-off of the main wellbore. The operational equipment such as the coiled tubing unit or wireline may also be controlled by the control system to cause the laser tool to move along longitudinal axis 47 while the laser beam is operational. This movement, together with operation of the laser beam, allows the laser tool to target longitudinal sections of the wellbore. In an example, translational motion along the longitudinal axis of the wellbore—which is vertical movement in some cases—may be implemented to apply laser beam to a vertical strip such as an inner surface of a wellbore or a casing. In some implementations, the laser tool may also be rotated around the longitudinal axis 47 during the translational movement. This combination of rotational and translational movement may be used to treat swaths of the wellbore.

Figure 7:
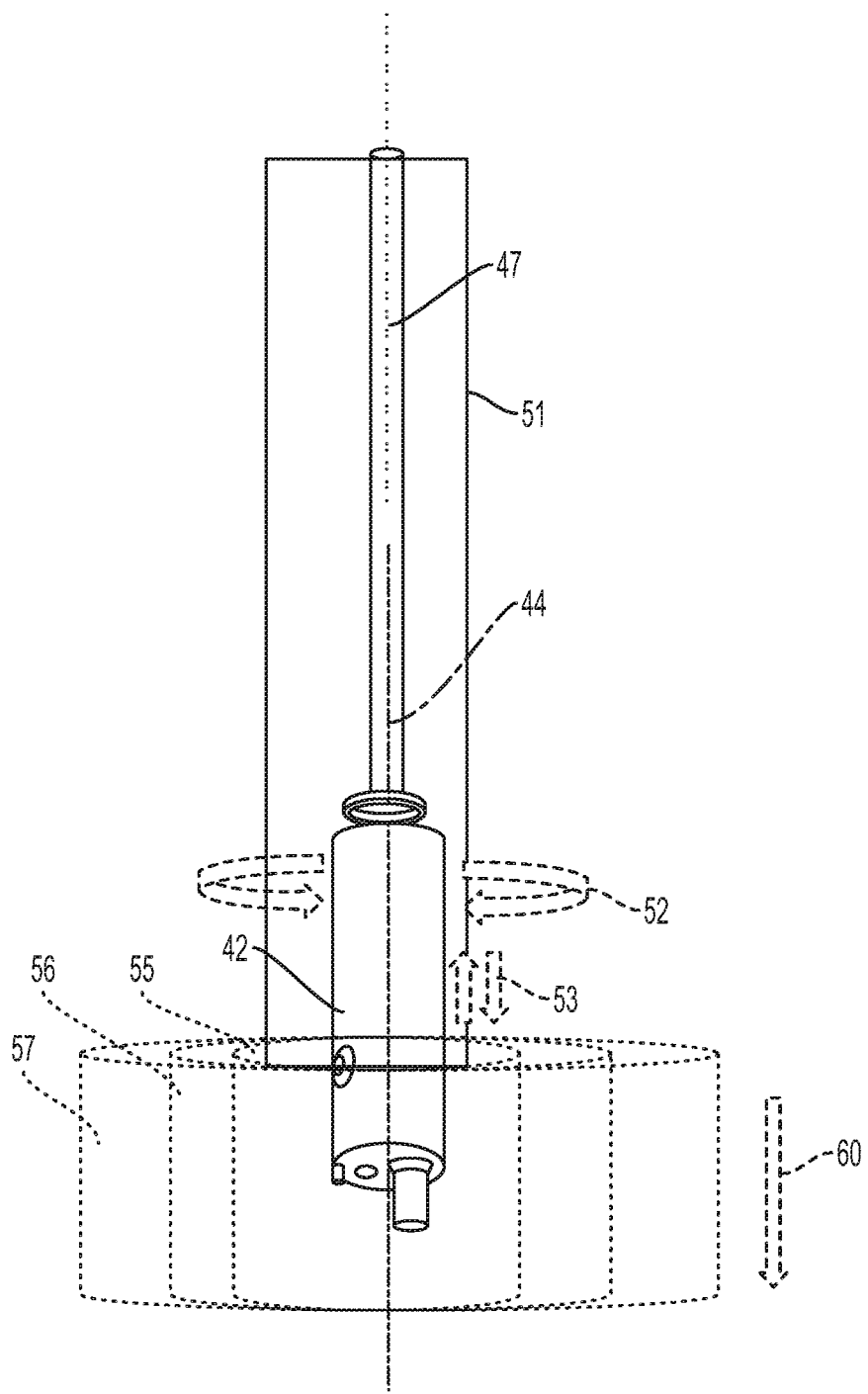
FIG. 7 shows use of a laser tool to expand a wellbore in stages.

FIG. 7 shows an example operation of laser tool 42. Laser tool 42 is controllable to rotate 360° around its longitudinal axis 44, as shown by arrows 52. Laser tool 42 is also controllable to move uphole and downhole along wellbore longitudinal axis 47. This movement is depicted by arrows 53. The laser tool is operated—in this example moved rotationally and translationally—to enlarge the diameter of an existing wellbore. In operation, shape 55 is formed within wellbore 51 during a first stage of operation using a laser beam having a first optical power. After shape 55 is formed, the laser tool is moved rotationally and translationally within shape 55 to form extended shape 56. Shape 56 is formed during a second stage of operation using a laser beam having a second optical power that is greater than the first optical power. After shape 56 is formed, the laser tool is moved rotationally and translationally within shape 56 to form extended shape 57. Shape 57 is formed during a third stage of operation using a laser beam having a third optical power that is greater than the second optical power. In this way, all or part of the wellbore may be enlarged. In addition, the laser beam may be used to drill deeper to extend shapes 55, 56, or 57 in the direction of arrow 60. In some implementations, the first, second, and third optical powers may be the same.

Figure 8:
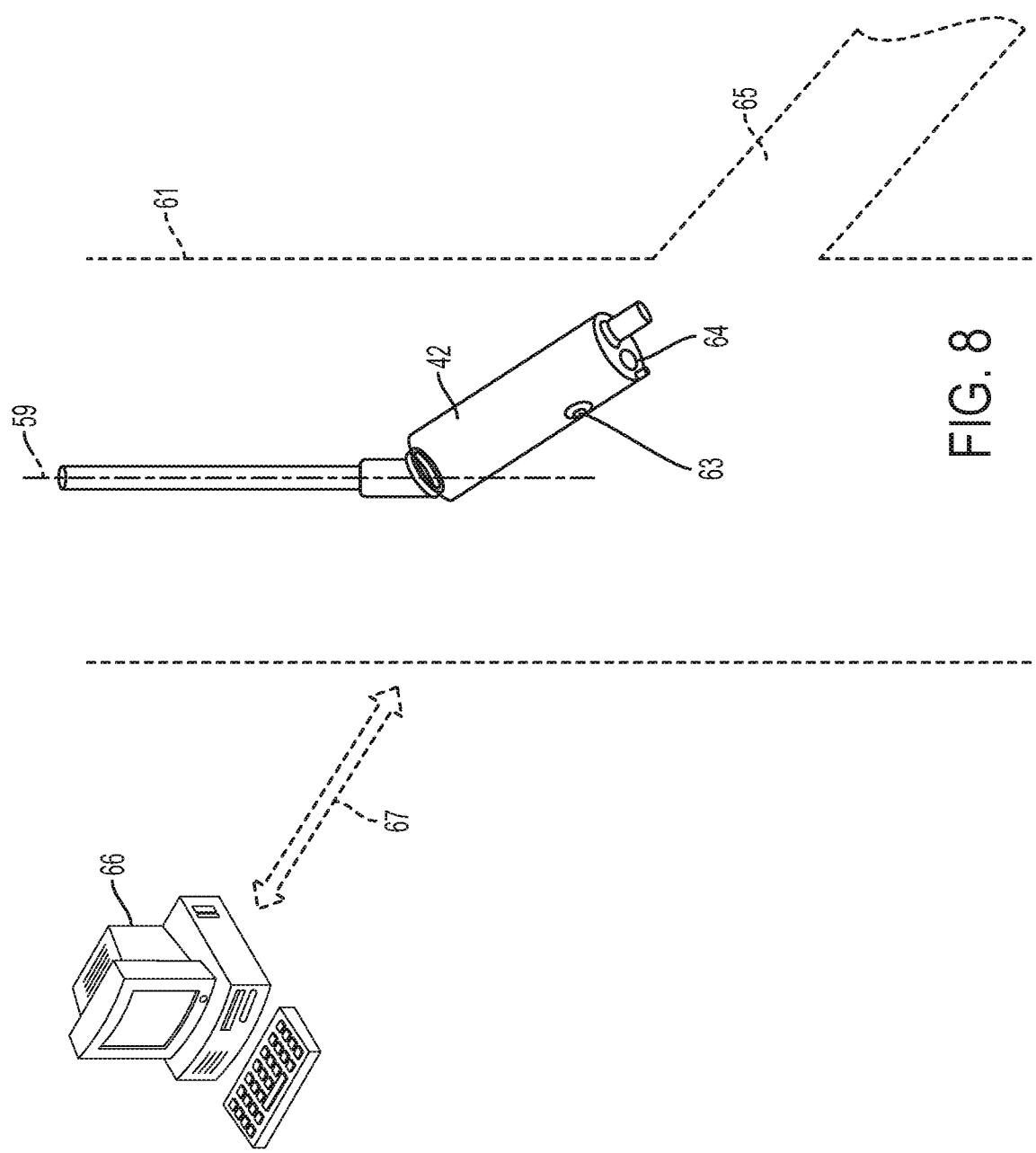
FIG. 8 shows forming an inclined wellbore using a laser tool.

FIG. 8 shows another example operation of laser tool 42. In this example, laser tool 42 is tilted within a wellbore 61. Tilting in this example is defined relative to wellbore longitudinal axis 59. A laser beam may be output from bottom port 64 to form an inclined wellbore 65 off of the main wellbore 61. Alternatively, the inclined wellbore may be formed by repositioning the side port 63. As shown, inclined wellbore 65 is non-vertical and extends from the main wellbore 61 away from the surface. The laser tool may also be controlled to form a second inclined wellbore (not shown) that is non-vertical and that extends from the main wellbore toward the surface.

In some implementations, the laser tool operates in a spinning mode to enlarge an existing wellbore. In some implementations, the laser tool operates in a drilling mode to form wellbores such as wellbores that extend at an incline from a main wellbore. In some implementations, the laser beam exits the bottom port only during the drilling mode and exits the side port only during the spinning mode.

The laser tool also includes a control system. In this example, the control system is configured to control movement of all or part of the laser tool to cause the laser beam to move within the wellbore. The control system can include, for example, a hydraulic system, an electrical system, or a motor-operated system to move the laser tool. As explained, the control system may include a motor or other mechanical mechanism to control rotation and tilting of the housing within a wellbore.

The control system may include a computing system 66. The computing system may be configured—for example, programmed—to control positioning and operation of the laser tool. For example, a drilling engineer may input commands to the computing system to control operation of the tool. The computing system may control operation of the hydraulics, electronics, or motors that move the laser tool, including its housing. Examples of computing systems that may be used are described in this specification. Signals may be exchanged between the computing system and the laser tool via wired or wireless connections. In some implementations, signals may be exchanged between the computing system and the laser tool via fiber optic media.

Alternatively or in addition the control system may include circuitry or an on-board computing system to implement control over the positioning and operation of the laser tool. The circuitry or on-board computing system is "on-board" in the sense that it is located on the tool itself or downhole with the tool rather than at the surface. The circuitry or on-board computing system may communicate with the computing system on the surface to control operation and movement of the laser tool. For example, commands input by a user into the computing system may be transferred for execution by the on-board computing system. Alternatively, the circuitry or on-board computing system may be used instead of the computing system located at the surface. For example, the circuitry or on-board computing system may be configured—for example programmed—while on the surface to implement control instructions in a sequence while downhole. The circuitry or on-board computing system may include solid state circuitry, programmable logic, or one or more microprocessors, for example.

The computing system may be configured to output commands to control rotating the housing within the wellbore, tilting the housing within the wellbore, or both rotating and tilting the housing within the wellbore. The rate of rotation, the extent of rotation, and the number of rotations may be controlled through commands received from the computing system at the surface or through pre-programmed commands stored in computer memory within the circuitry or on-board computing system. The angular extent of the tilt and duration of the tilt may be controlled through commands received from the computing system at the surface or through pre-programmed commands stored in computer memory within the circuitry or on-board computing system.

The commands may also include commands to turn the laser tool on, to adjust an intensity of the laser beam, or to query environmental sensors on the laser tool.

The laser tool also includes cabling (not shown) that runs uphole to the surface. In an example, the cabling may include power cables to run electrical power to the laser tool. The electrical power may be generated uphole in some implementations. In an example, the cabling may include communication cables such as Ethernet or other wiring to carry the commands to and from the laser tool. In some implementations, all or some of these commands may be conveyed wirelessly. Arrow 67 in FIG. 8 represents communications between the laser tool and computing system 66.

In some implementations, all or part of the laser tool may be configured to withstand at least some environmental conditions within the wellbore. For example, all or part of the laser tool may be made of materials that withstand environmental conditions within the wellbore such as pressure within the wellbore, temperature within the wellbore, vibrations within the wellbore, debris within the wellbore, and fluid within the wellbore. The materials that make up components of the laser tool may include one or more of the following: iron, nickel, chrome, manganese, molybdenum, niobium, cobalt, copper, titanium, silicon, carbon, sulfur, phosphorus, boron, tungsten, steel, steel alloys, stainless steel, or tungsten carbide.

Referring back to FIG. 3, in some implementations the laser tool may include one or more environmental or other sensors 68 to monitor conditions downhole. The sensors may include one or more temperature sensors, one or more vibration sensors, one or more pressure sensors, or some combination of these or other sensors.

In an example implementation, the laser tool includes a temperature sensor configured to measure a temperate at its current location and to output signals representing that temperature. The signals may be output to the computing system located on the surface. In response to signals received from the temperature sensor, the computing system may control operation of the system. For example, if the signals indicate that the temperature downhole is great enough to cause damage to downhole equipment, the computing system may instruct that action be taken. The computing system may send instructions based on input from a drilling engineer. For example, all or some downhole equipment including the laser tool may be extracted from the wellbore. In some implementations, data collected from the temperature sensor can be used to monitor the intensity of the laser beam. Such measurements may also be used to adjust the intensity or the energy of the laser beam. Signals may be sent downhole wirelessly or via cabling to control operation of the laser tool.

In some implementations, sensor signals may indicate a temperature that exceeds a set point that has been established for the laser tool or downhole equipment. For example, the set point may represent a maximum temperature that the laser tool can withstand without overheating. If the set point is reached, the laser tool may be shut-down. This may be done in response to input from a drilling engineer or automatically—that is, absent such input. The value of the set point may vary based on type of laser being used or the materials used for the manufacture of the laser tool, for example. Examples of set points include 1000° C., 1200° C., 1400° C., 1600° C., 1800° C., 2000° C., 2500° C., 3000° C., 3500° C., 4000° C., 4500° C., 5000° C., 5500° C., and 6000° C. In an example implementation, the set point is between 1425° C. and 1450° C.

Pressure and vibration sensors, for example, may also output sensor readings that affect operation of the system such as changes to the energy of the laser beam or shutting-down operation of the system.

In some implementations, the laser tool may include acoustic sensors for obtaining acoustic data or an acoustic camera configured both to obtain acoustic data and to capture images or video based on the acoustic data. For example, one or more acoustic sensors may be located on the side of the housing, the bottom of the housing, or both the side and the bottom of the housing. For example, one or more acoustic cameras may be located on the side of the housing, the bottom of the housing, or both the side and the bottom of the housing.

Data obtained from the acoustic sensors or the acoustic camera may be sent to the surface computing system via optical transmission media or electrical cabling. At the computing system, the data may be processed to view the operations down-hole in real-time. In this regard, real-time may not mean that two actions are simultaneous but rather may include actions that occur on a continuous basis or track each other in time taking into account delays associated with processing, data transmission, and hardware. At the computing system, the data may be processed to determine downhole conditions. For example, if an image of a hole being formed shows that the hole is not within a target location, the computing system may control the laser tool to change the location of the hole. For example, if the acoustic data indicates the presence of excess debris or unexpected rock in the formation, operation of the laser tool may be changed to account for these conditions. The computing system may control these operations based on input from a drilling engineer, for example.

In some implementations, data obtained from the acoustic sensors or the acoustic camera may be sent to a computing system that is on-board the laser tool. The on-board computing system may perform all or some of the operations described in the preceding paragraph. In some implementations, the on-board computing system may cooperate with the surface-based computing system to control operation of the laser tool based on sensor readings. For example, the on-board computing system may be configured to control operation when the sensor readings are within a prescribed range. That is, automatic controls may be implemented rather than requiring input from a drilling engineer. In some implementations, if the sensor readings are outside the prescribed range, the surface-based computing system may take over control of the laser tool or a drilling engineer may take over control of the laser tool by providing commands to the laser tool via the surface-based computing system.

Figure 9:
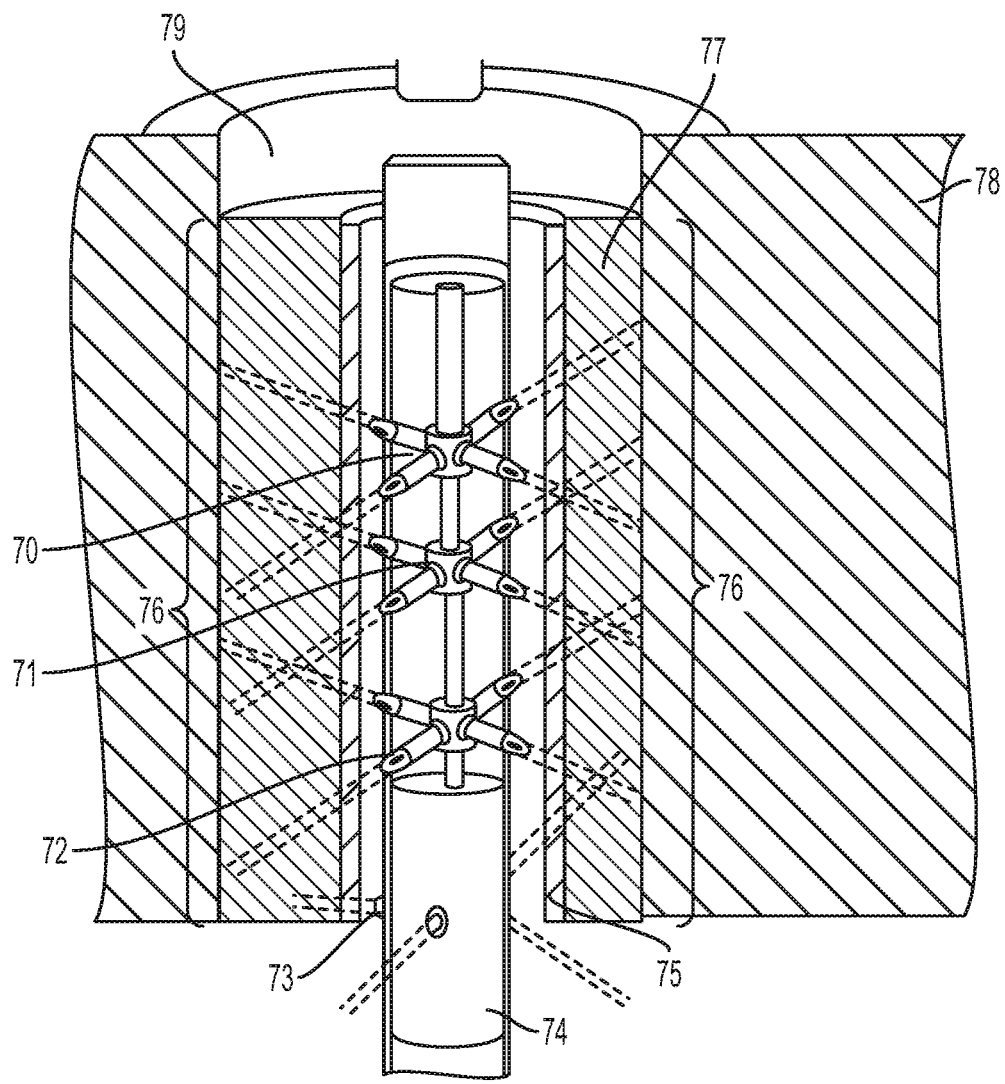
FIG. 9 is a partial cut-away view of connected laser tools.

In some implementations, multiple sets 70, 71, 72, and 73 of laser tools may connected within a wellbore as shown in FIG. 9. In this example, there are four connected laser tools per set 70, 71, 72, and 73. Each of these laser tools may have the structure and function of the laser tools shown in FIGS. 1 to 8. Set 73 is shown behind housing 74 while the other sets are shown with housing 74 removed. Each of the sets of laser tools may be located at a different depth within the wellbore to output laser beams 76 to different parts of the wellbore. The connected laser tools may be assembled at the surface and lowered into the wellbore using a coiled tubing unit or wireline. Each laser tool may be separately controllable using a common computing system. Operation of the multiple laser tools may be coordinated based on the results to be achieved. For example, laser beams 76 may be controlled to penetrate casing 75, cement 77, and rock formation 78 through which wellbore 79 extends.

Figure 10:
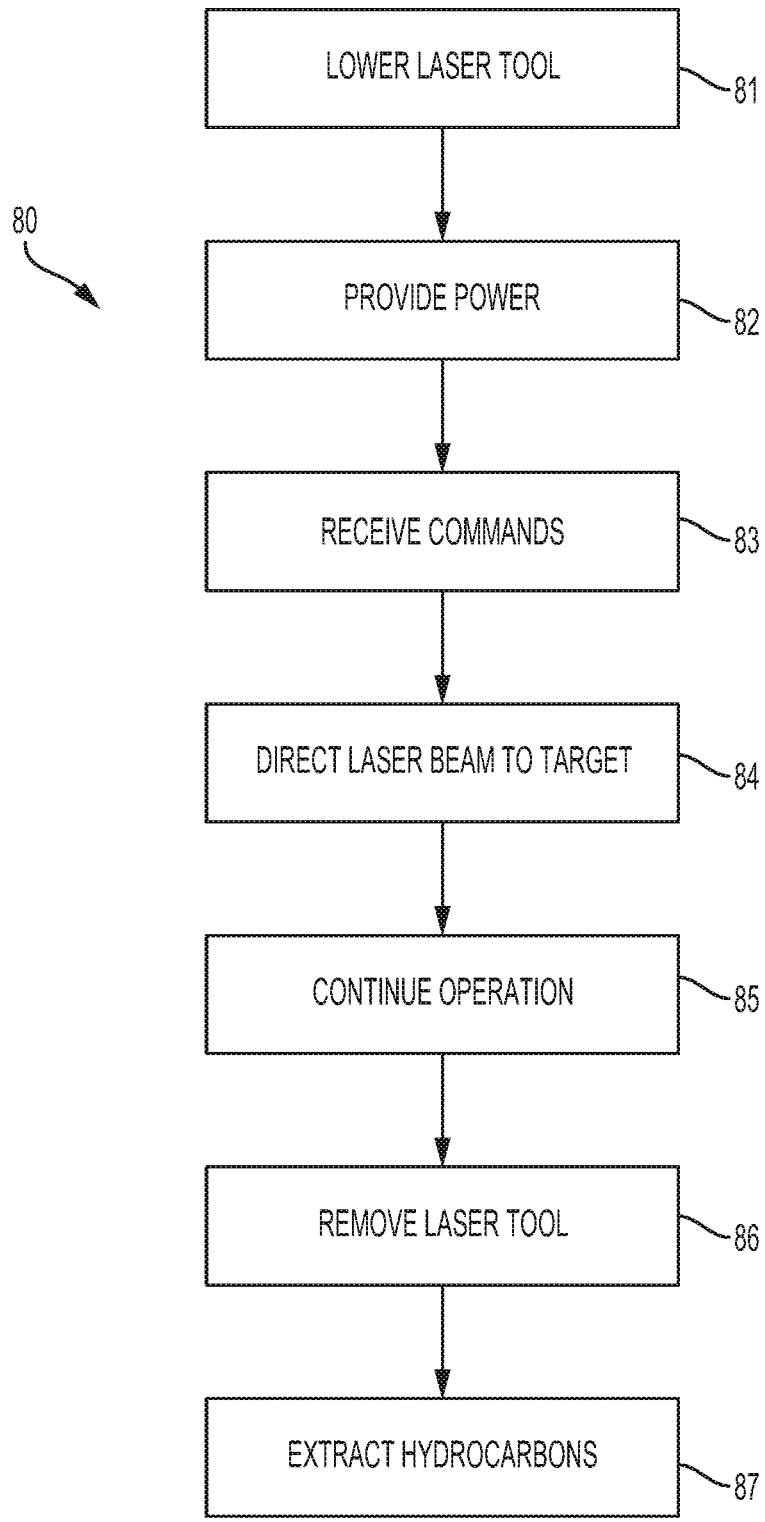
FIG. 10 is a flowchart showing example operation of a laser tool.

Referring to FIG. 10, in an example process 80, the laser tool is lowered (81) downhole in a wellbore. As described, the laser tool may be lowered from the surface using coiled tubing or a wireline. In some implementations, power to operate the laser generator may be provided (82) from a power source at the surface. As explained, the power may be provided via electrical cabling. In some implementations, power to operate the laser generator may be provided from a power source located downhole such as a battery, a capacitor, or a fluid motor. Commands may be sent downhole and received (83) by the laser tool. As explained, the commands may be output by the computing system and may instruct the operation and configuration of the laser tool. For example, the commands may specify motion of the housing, positioning of the laser tool, and the optical power of the laser beam. As noted, in some implementations, the laser beam has an optical power of at least one kilowatt (1 kW). The laser beam is directed (84) to a target such as an inner surface of the wellbore in order to cut through at least part of a structure from within the wellbore. Directing the laser beam may include tilting all or part the laser tool, rotating the laser tool at least partly, or both rotating and tilting the laser tool. The structure may include rock within the wellbore, a metal pipe or casing within the wellbore, cement within the wellbore, or debris within the wellbore. In this context, cutting through the structure may including removing all or part of the structure through sublimation, spallation, or both sublimation or spallation. Sublimation includes changing from a solid phase directly into a gaseous phase without first changing into a liquid phase. Different types of rock behave differently when subjected to different amounts of laser-induced heating. For example, if rock in a formation contains clay, the rock may collapse at temperatures between 300° C. and 575° C. If the rock contains calcium carbonate, the rock will sublimate at temperatures greater than 1100° C. If the rock contains Berea sandstone, the rock will melt at temperatures greater than 1100° C.

Operation of the laser tool may continue (85) until the laser tool is instructed to stop or until downhole conditions require operation to stop. The laser tool may be removed (86) from the wellbore following operation. Following removal of the laser tool, hydrocarbon, water, or both may be extracted (87) from the wellbore. In some implementations, the laser tool may be positioned to treat a different part of the wellbore. For example, following operation 84, the laser too may be moved uphole or downhole within the wellbore. At this new location, operations 82 to 85 may be repeated. This may occur a number of times before the laser tool is removed (86) and hydrocarbons are extracted (87).

FIGS. 11, 12, 13, and 14 show different examples of main wellbores that have been shaped using the laser tool. FIGS. 11 and 14 are three-dimensional (3D) views of the main wellbore and FIGS. 12 and 13 are two-dimensional (2D) views showing a cross-section of the main wellbore. In FIG. 11, main wellbore 89 has been enlarged in regions 90, 91, and 92. These regions constitute voids in the wellbore that locally enlarge the volume of the wellbore. In other words, at each region, the volume of the wellbore is enlarged. In FIG. 12, main wellbore 94 has been enlarged in regions 95, 96, and 97. Note that regions 95 and 96 have trapezoidal cross-sections. Also in FIG. 12, inclined wellbores 98 and 99 have been formed that extend from main wellbore 94. In FIG. 13, main wellbore 100 has been enlarged in regions 101, 102, and 103. In regions 101, 102, and 103 the enlargement is not around the entire circumference of the main wellbore, as shown. In FIG. 14, main wellbore 110 has been enlarged in regions 111 and 112. Regions 111 and 112 have different lengths 113 and 114.

Referring to FIG. 15, the laser tool may be used to enlarge main wellbore 115 in region 116. For example, the laser tool may be rotated and moved vertically in region 116. Then, the laser tool may be tilted in region 116 to form inclined wellbores 117 (or tunnels) to hydrocarbon deposits 119 and 120. Hydrocarbons from those deposits may flow into region 116 of main wellbore 115. For example, the hydrocarbons may flow from inclined wellbores 117 into region 116 via the capillary effect. From region 116, the hydrocarbons may be pumped to the surface via main wellbore 115.

Figure 16:
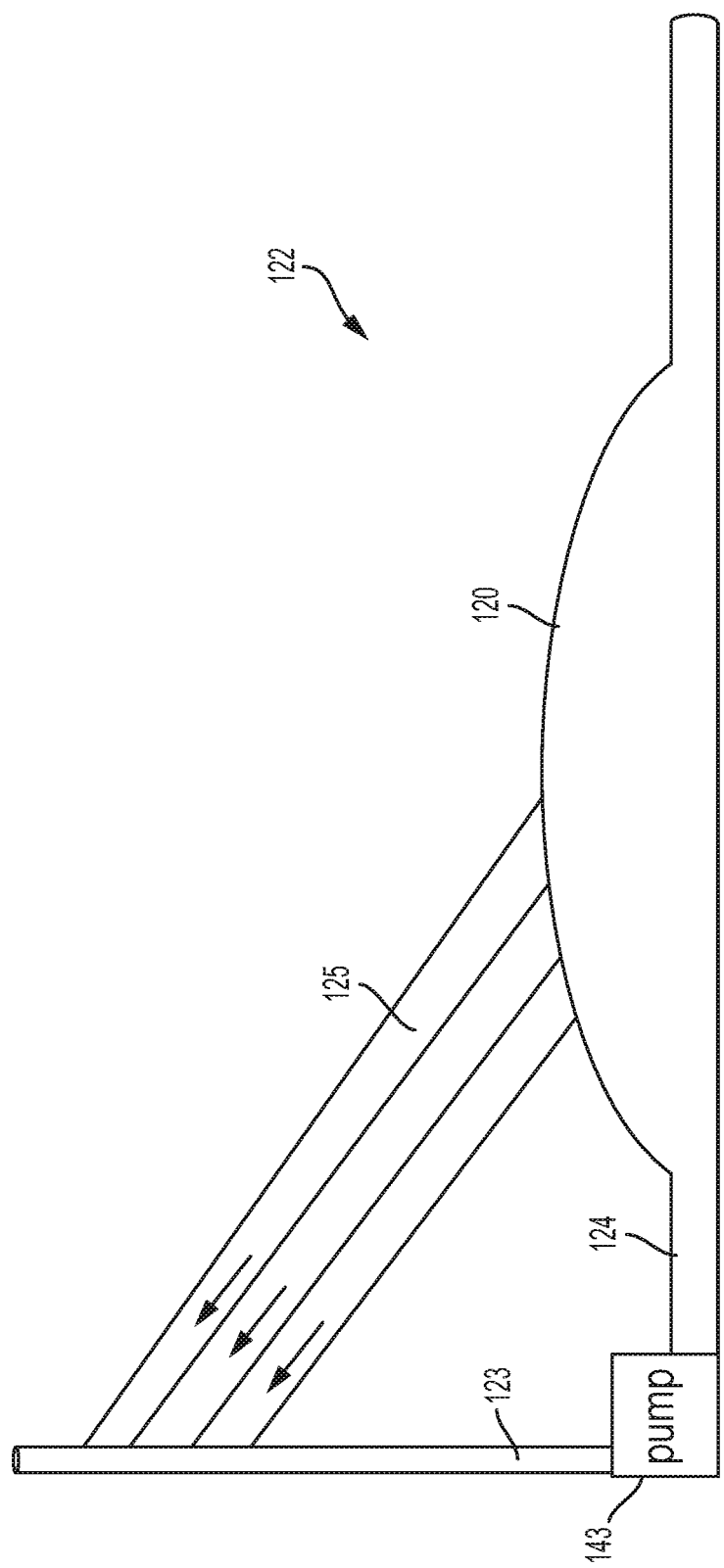
FIGS. 16, 17, and 18 show example uses of a laser tool to create inclined wellbores leading to hydrocarbon deposits within a rock formation.

Referring to FIG. 16, the laser tool may be used to extract rock to form a dome 120 within a hydrocarbon-bearing formation 122. For example, the laser tool may be moved downhole through a vertical wellbore 123 and a horizontal wellbore 124 to a point where the dome is to be formed. The laser tool may be rotated, tilted, or both rotated and tilted to form the dome shape. Gas within the hydrocarbon-bearing formation naturally rises to fill the dome. The dome may also depressurize gas dissolved in liquid and release the gas from the liquid into the dome. For example, hydrogen sulfide ($H_2S$) gas may be released. The hydrogen sulfide gas may flow to the surface in separate tubing from the liquid, which may be run through inclined wellbores formed by the laser tool. In this regard, the laser tool may be moved uphole to form inclined wellbores 125 that branch-off from vertical wellbore 123. The inclined wellbores extend to the dome containing the gas. The gas flows through inclined wellbores 125 to vertical wellbore 123. Meanwhile, liquid such as oil and water that is accessible via horizontal wellbore 124 is pumped from the hydrocarbon-bearing formation via vertical wellbore 123. In some cases, the gas may merge with the liquid at some point within the vertical wellbore 123 to provide additional lift to assist in moving the liquid out of the well. In some cases, the gas may include hydrocarbons. In some cases, the gas may be hydrogen sulfide as described previously, in which case causing the gas to flow to the surface through separate tubing increases the safety of the system.

In some implementations, a pump 143 used to pump the liquid may be located within the wellbore, for example at the bottom of the wellbore. This positioning of the pump may increase the efficiency of the pump. In some cases, the efficiency of the pump is defined by a ratio of liquid horsepower output from the pump to shaft horsepower input for the pump. The presence of gas may decrease the efficiency of the pump during its operation. That is, the presence of the gas may increase the time that the pump operates to force a given amount of liquid out of the wellbore. The gas flowing through inclined wellbores 125 bypasses the pump, leaving the pump free to operate on all or mostly all liquids. As a result, the efficiency of the pump may be increased relative to situations where the pump is required to pump both gas and liquid. The increased efficiency of the pump and the lift provided by the gas in assisting moving the liquid out of the well may result in an overall increase in lift efficiency for the well.

Figure 17:
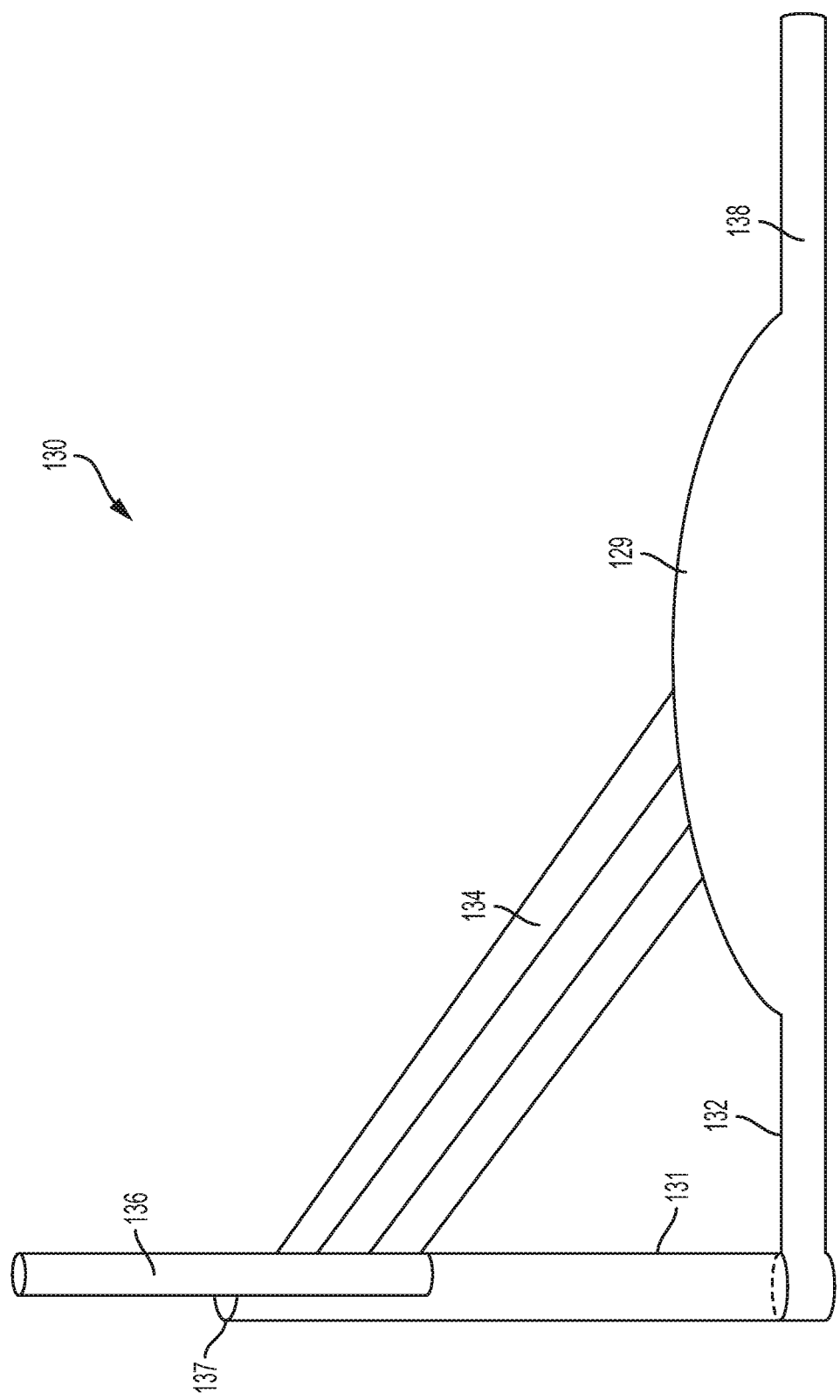

Referring to FIG. 17, the laser tool may be used to extract rock to form a dome 129 within a formation 130. As explained previously, the laser tool may be moved downhole through a vertical wellbore 131 and a horizontal wellbore 132 to a point where the dome is to be formed. The laser tool may be rotated, tilted, or both rotated and tilted to form the dome shape. Hydrocarbons such as oil that are accessible via the horizontal wellbore rise naturally above higher-density water to fill the dome. The laser tool may be moved uphole to form inclined wellbores 134 that branch-off from vertical wellbore 131. The inclined wellbores extend to the dome containing the hydrocarbons. The hydrocarbons flow through inclined wellbores 134 to vertical wellbore 131 via the capillary effect. Meanwhile, liquid, such as water, is pumped from the formation via vertical wellbore 131. In this example, vertical wellbore 131 may contain separate tubing 136 to transport the hydrocarbons to the surface and separate tubing 137 to transport the water to the surface. For example, tubing 136 is connected to inclined wellbores 134 to transport the hydrocarbons and tubing 137 extends downhole within vertical wellbore 131 to transport the water 138 located below the dome.

Figure 18:
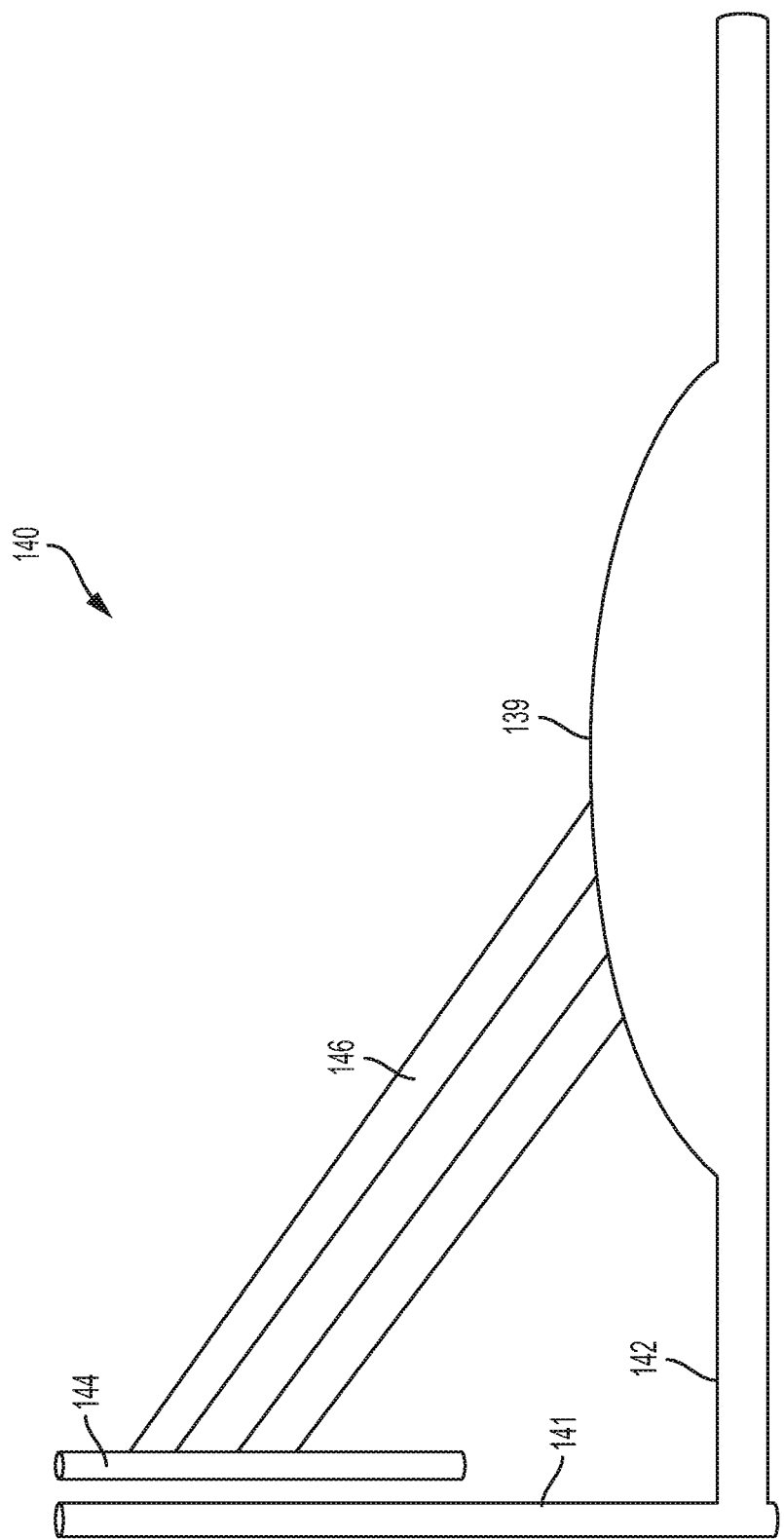

Referring to FIG. 18, the laser tool may be used to extract rock to form a dome 139 within a formation 140. As explained previously, the laser tool may be moved downhole through a vertical wellbore 141 and a horizontal wellbore 142 to a point where the dome is to be formed. The laser tool may be rotated, tilted, or both rotated and tilted to form the dome shape. Hydrocarbons such as oil within the formation rise to fill the dome as previously explained. The laser tool may then be moved into a vertical wellbore 144 that is separate from and not connected to vertical wellbore 141 to form inclined wellbores 146 that branch-off from vertical wellbore 144. The inclined wellbores extend to the dome containing the hydrocarbon. The hydrocarbons flow through inclined wellbores 146 to vertical wellbore 144 via the capillary effect. Meanwhile, liquid such as water is pumped from the formation through separate vertical wellbore 141.

Figure 19:
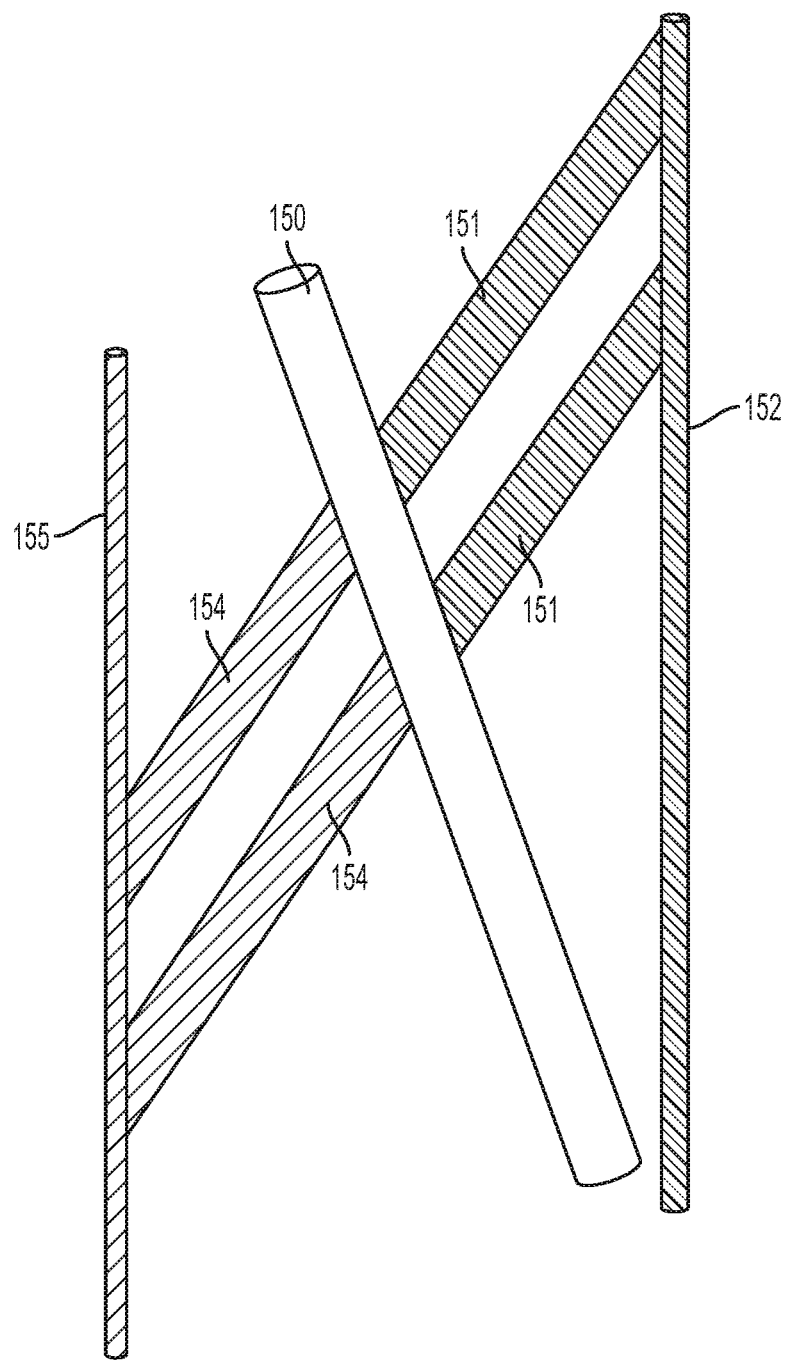
FIG. 19 shows an example use of a laser tool to create inclined wellbores that separate water from hydrocarbons downhole.

Referring to FIG. 19, the laser tool may be used to form inclined wellbores to separate water and hydrocarbons such as oil downhole. The configuration of FIG. 19 may be formed by lowering the laser tool downhole in a main inclined wellbore 150. The laser tool may be tilted within the main inclined wellbore 150 to direct the laser beam to a wall in main inclined wellbore 150 to form inclined wellbores 151 that connect to a vertical hydrocarbon well 152. The laser tool may be tilted within main inclined wellbore 150 to direct the laser beam to a wall in the main inclined wellbore to form inclined wellbores 154 that connect to a vertical water well 155. Hydrocarbons may be extracted via the inclined wellbores 151 and water may be extracted via inclined wellbores 154. More specifically, a mixture of water and hydrocarbons is pumped uphole via main inclined wellbore 150. The water and hydrocarbons separate within the main inclined wellbore due to the difference in their densities. All, a majority, or some of the water, which is more dense than the hydrocarbon, flows downward into inclined wellbores 154 and then into vertical water wellbore 155, from which it is pumped to the surface. All, a majority, or some of the hydrocarbon, which is less dense than the water, flows upward via the capillary effect into inclined wellbores 151 and then into vertical hydrocarbon wellbore 152, from which it is pumped to the surface. In these examples, a majority includes fifty percent (50%) or greater.

Figure 20:
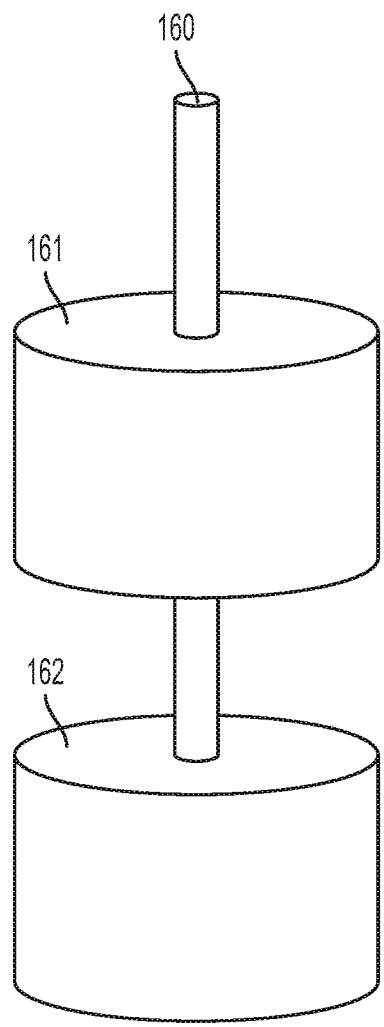
FIG. 20 shows an example wellbore shape formed in a vertical wellbore using a laser tool.
Figure 21:
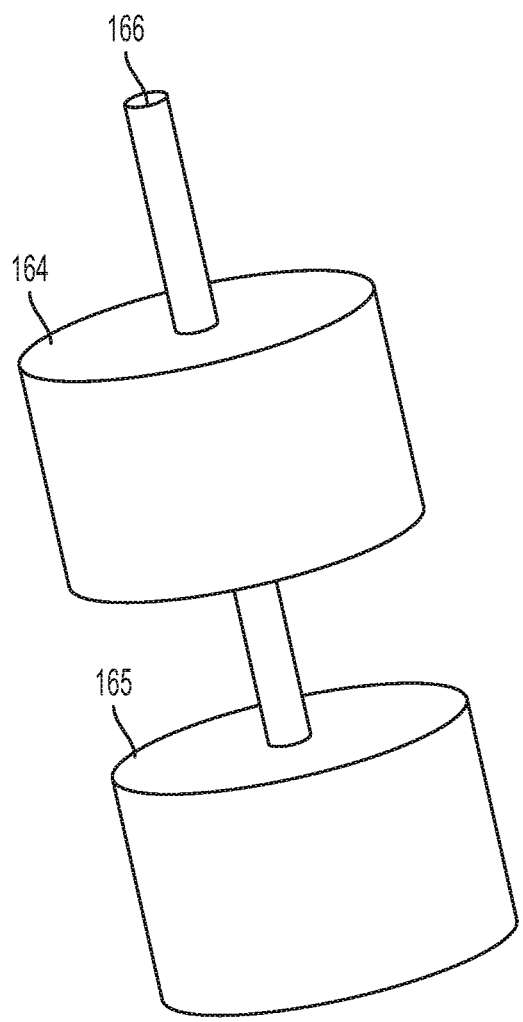
FIG. 21 shows an example wellbore shape formed in a deviated wellbore using a laser tool.
Figure 22:
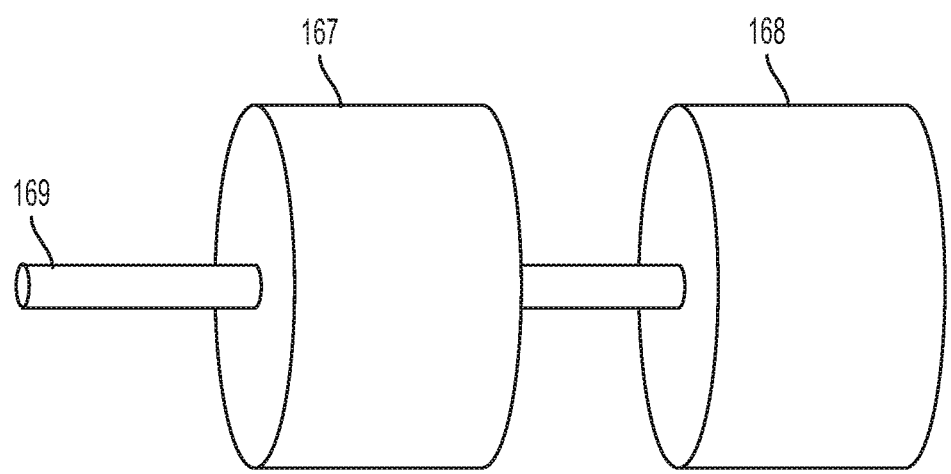
FIG. 22 shows an example wellbore shape formed in a horizontal wellbore using a laser tool.

Referring to FIG. 20, the laser tool may be used to form large cylindrical regions 161 and 162 in a vertical wellbore 160 through rotation, as described previously. Referring to FIG. 21, the laser tool may be used to form large cylindrical regions 164 and 165 in a deviated wellbore 166 through rotation, as described previously. Referring to FIG. 22, the laser tool may be used to form large cylindrical regions 167 and 168 in a horizontal wellbore 169 through rotation, as described previously. Enlarging the wellbores may improve fluid flow and enable separation of hydrocarbons and water downhole due to the resulting increase in the volume of the wellbore. For example, the laser tool may be operated within the wellbore to cause the laser beam to extract rock to form one or more voids in the hydrocarbon-bearing formation surrounding the wellbore. Each void may have a shape that enables separation of mixtures or emulsions within the wellbore. For example, the mixtures or emulsions may include some or of all of hydrocarbon liquids that include oil, hydrocarbon gases, or aqueous fluids that include water. Due to gravity, components of the mixtures or emulsions separate. For example, less density components settle above greater density components. Operation of the laser tool may be as described previously. For example, the laser tool may be tilted, rotated, or both rotated and tilted during output of the laser beam in order to form the one or more voids in the hydrocarbon-bearing formation.

The example laser tools may operate downhole to stimulate a wellbore. For example, the laser tools may operate downhole to form a fluid flow path through a rock formation. The fluid flow path may be formed by controlling the laser tool to direct a laser beam toward the rock formation. In an example, the laser beam has an energy density that is great enough to cause at least some of the rock in the rock formation to sublimate. In this example, the sublimation of the rock forms tunnels or cracks through the rock formation. Fluids such as water may be introduced into those tunnels or cracks to fracture the rock formation and thereby promote the flow of production fluid, such as oil, from the rock formation into the wellbore. In some cases, heat from the laser beam alone may generate cracks in a formation through which hydrocarbons may flow. Accordingly, stimulation may be achieved without the use of hydraulic fracturing fluids, such as water.

The example laser tools may operate downhole to form openings in a casing in the wellbore to repair cementing defects. In an example, a wellbore includes a casing that is cemented in place to reinforce the wellbore against a rock formation. During cementing, cement slurry is injected between the casing and the rock formation. Defects may occur in the cement layer, which may require remedial cementing. Remedial cementing may involve squeezing additional cement slurry into the space between the casing and the rock formation. The example laser tools may be used to direct a laser beam to the casing to form one or more openings in the casing on or near a cementing defect. The openings may provide access for a cementing tool to squeeze cement slurry through the opening into the defect.

The example laser tools may operate downhole to form openings in a casing in the wellbore to provide access for a wellbore drilling tool. In an example, an existing single wellbore is converted to a multilateral well. A multilateral well is a single well having one or more wellbore branches extending from a main borehole. In order to drill a lateral well into a rock formation from an existing wellbore, an opening is formed in the casing of the existing wellbore. The example laser tools may be used to form the opening in the casing at a desired location for a wellbore branching point. The opening may provide access for drilling equipment to drill the lateral wellbore.

The example laser tools may operate downhole to form openings in a casing in the wellbore to provide sand control. During operation of a well, sand or other particles may enter the wellbore causing a reduction in production rates or damage to downhole equipment. The example laser tools may be used to form a sand screen in the casing. For example, the laser tools may be used to perforate the casing by creating a number of holes in the casing that are small enough to prevent or to reduce entry of sand or other particles into the wellbore while maintaining flow of production fluid into the wellbore.

The example laser tools may operate downhole to re-open a blocked fluid flow path. In this regard, production fluid flows from tunnels or cracks in the rock formation into the wellbore through holes in the wellbore casing and cement layer. These production fluid flow paths may become clogged with debris contained in the production fluid. The example laser tools may be used to generate a laser beam that has an energy density that is great enough to liquefy or to sublimate the debris in the flow paths, allowing for removal of the debris together with production fluid. For example, a laser tool may be used to liquefy or to sublimate sand or other particles that may have become packed tightly around a sand screen in the casing, thereby re-opening a production fluid flow path into the wellbore.

During operation, one or more metal components of a wellbore may become rusted, scaled, corroded, eroded, cracked, split, or otherwise defective. Such defects may be repaired using welding techniques. For example, in some implementations, material of an object within the wellbore, such as metal in a casing that lines the wellbore, may be melted using the laser tool. Resulting molten metal may flow over or into a defect, for example due to gravity, thus covering or repairing the defect upon cooling and hardening. In some implementations, a laser tool may be used in combination with a tool that provides filler material to the defect. The filler material may be metal and may be separate from the material that is to be welded by the laser tool. The laser tool may be used to melt an amount of filler material positioned on or near a defect. The molten filler material may flow over or into a defect, thus covering or repairing the defect upon cooling and hardening.

The laser tool may be used to generate a laser beam that has an energy density that is great enough to liquefy metal or other material to form a weld. In an example, to weld carbon or stainless steel using a laser beam having a 400 micron focus spot diameter, about 1 kW of laser power is needed for every millimeter of material to be penetrated. Thus, using a laser beam having a 400 micron focus spot diameter, if a weld is to be made on an 8 millimeter thick stainless steel casing, about 8 kW of laser power will typically be required to complete the weld.

Figure 23:
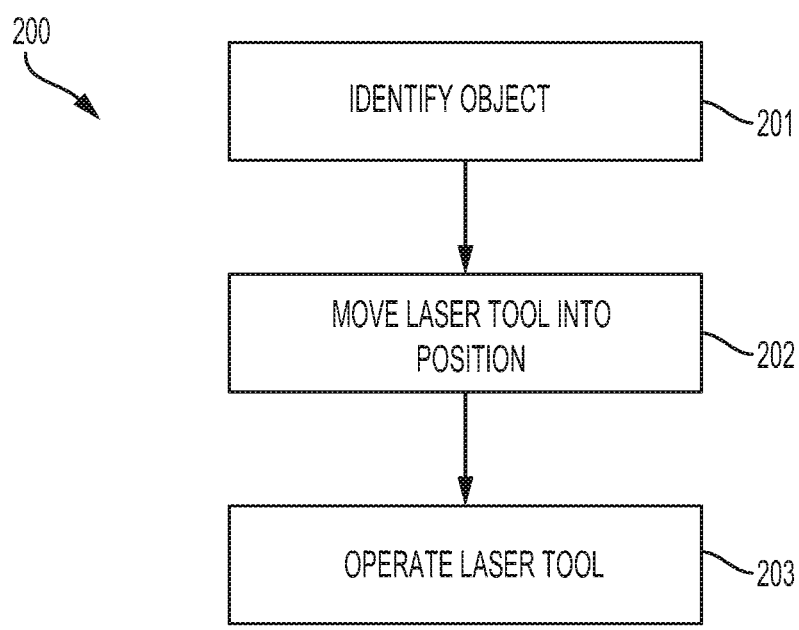
FIG. 23 is a flowchart showing an example process for performing welding using a laser tool.

FIG. 23 is a flowchart showing an example process 200 for performing welding using an example laser tool described in this specification. Process 200 includes identifying (201) an object that is to be welded within a wellbore. This operation may be executed by the control system. For example, images may be obtained from the acoustic camera identifying a crack, hole, or other defect in a casing lining the wellbore that may be repaired through welding. The laser tool may be moved (202) into a position within the wellbore to perform welding. For example, the coiled tubing unit or wireline may move the laser tool so that the laser tool is at the same depth or just above or below the defect. The laser tool may be operated (203) within the wellbore to direct a laser beam toward the object to perform welding at the object. In some implementations, the laser beam may be collimated or focused to produce a laser beam having an energy density needed to create the weld. Operating the laser tool may include rotating the laser tool at least partly around a longitudinal axis of its housing and tilting the housing relative to a longitudinal axis of the wellbore in order to direct the laser beam. Movement of the laser tool, and thus the laser beam, within the wellbore may be continued until the weld is completed.

The example laser tools may operate downhole to heat solid or semi-solid deposits in a wellbore. In producing wells, solid or semi-solid substances may deposit on wellbore walls or on downhole equipment causing reduced flow or blockages in the wellbore or production equipment. Deposits may be or include condensates (solidified hydrocarbons), asphaltene (a solid or semi-solid substance comprised primarily of carbon, hydrogen, nitrogen, oxygen, and sulfur), tar, hydrates (hydrocarbon molecules trapped in ice), waxes, scale (precipitate caused by chemical reactions, for example calcium carbonate scale), or sand. The example laser tools may be used to generate a laser beam that has an energy density that is great enough to melt or to reduce the viscosity of deposits. The liquefied deposits can be removed together with production fluid or other fluid present in the wellbore.

At least part of the example laser tools and their various modifications may be controlled by a computer program product, such as a computer program tangibly embodied in one or more information formation carriers. Information carriers include one or more tangible machine-readable storage media. The computer program product may be executed by a data processing apparatus. A data processing apparatus can be a programmable processor, a computer, or multiple computers.

A computer program may be written in any form of programming language, including compiled or interpreted languages. It may be deployed in any form, including as a stand-alone program or as a module, component, subroutine, or other unit suitable for use in a computing environment. A computer program may be deployed to be executed on one computer or on multiple computers. The one computer or multiple computers can be at one site or distributed across multiple sites and interconnected by a network.

Actions associated with implementing the systems may be performed by one or more programmable processors executing one or more computer programs. All or part of the systems may be implemented as special purpose logic circuitry, for example, an field programmable gate array (FPGA) or an ASIC application-specific integrated circuit (ASIC), or both.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described without adversely affecting their operation or the operation of the system in general. Furthermore, various separate elements may be combined into one or more individual elements to perform the functions described in this specification.

Other implementations not specifically described in this specification are also within the scope of the following claims.

What is claimed:

1. A system comprising:
   a laser tool comprising:
      an optical assembly configured to shape a laser beam for output; and
      a housing that contains the optical assembly, the housing comprising a side output port disposed within a side surface of the housing, the side output port comprising a fiber optic medium for transmitting the laser beam from inside the housing to outside the housing, the housing further comprising a bottom port disposed within a bottom surface of the housing and configured to output the laser beam, the housing being configured for movement to direct the laser beam within a wellbore, the movement comprising rotation of the laser tool at least partly around a longitudinal axis of the housing and tilting the housing relative to a longitudinal axis of the wellbore; and
   a control system to control at least one of the movement of the housing and an operation of the optical assembly to direct the laser beam within the wellbore.

2. The system of claim 1, where shaping the laser beam comprises focusing the laser beam,
   where the laser tool comprises an optical power of 1 kW, and
   where the laser tool comprises an intensity of 5 kW/cm2.

3. The system of claim 1, where shaping the laser beam comprises collimating the laser beam, and
   where a partial rotation of the laser tool around the longitudinal axis shapes walls of the wellbore by the laser beam via the side output port resulting in one or more enlarged regions, where the one or more enlarged regions do not extend around the entire circumference of the wellbore.

4. The system of claim 1, where shaping the laser beam comprises spreading the laser beam.

5. The system of claim 1, where the optical assembly comprises:
   a first lens in a path of the laser beam;
   a second lens in the path of the laser beam, the second lens being downstream from the first lens in the path of the laser beam; and
   an adjustment mechanism to change a distance between the first lens and the second lens, the adjustment mechanism being controllable by the control system.

6. The system of claim 5, where the first lens comprises a focusing lens to focus the laser beam, the second lens comprises a collimating lens to receive the laser beam from the focusing lens and to collimate the laser beam, and the adjustment mechanism comprises an adjustable rod to move the first lens along the path of the laser beam.

7. The system of claim 5, where the first lens comprises a focusing lens to focus the laser beam, the second lens comprises a diverging lens to receive the laser beam from the focusing lens and to cause the laser beam to spread, and the adjustment mechanism comprises an adjustable rod to move the first lens along the path of the laser beam.

8. The system of claim 5, where the optical assembly comprises:
a beam director that is movable into or out of the path of the laser beam, the beam director being downstream from the first lens in the path of the laser beam, the beam director for changing the path of the laser beam, the beam director being controllable by the control system;
where, when the beam director is fully retracted, the laser beam exits the housing through the bottom output port.

9. The system of claim 8, where the beam director comprises at least one of a mirror, a beam splitter, or a prism.

10. The system of claim 1, where the housing comprises a purging port, the purging port for outputting a purging medium,
where the purging medium comprises a liquid halocarbon, and
where the liquid halocarbon comprises a halocarbon-oil comprising a viscosity in a range from 0.8 centipoise (cP) to 1000 cP at 100 degrees Fahrenheit.

11. The system of claim 10, further comprising:
a rotational structure comprising fins that are rotatable to force the purging medium into the housing; and
one or more cover lenses to protect the optical assembly.

12. The system of claim 11, where the purging media comprises an inert gas, and where the one or more cover lenses do not affect the size or shape of the laser beam.

13. The system of claim 11, where the purging media comprises a liquid,
where the one or more cover lenses allow the laser beam to pass unchanged,
where the one or more cover lenses fit within the housing, and
where the one or more cover lenses are held in place by multiple rings.

14. The system of claim 1,
where the laser beam has an optical power of at least one kilowatt (1 kW),
where the wellbore comprises a main wellbore, and
where the laser beam forms an inclined wellbore off of the main wellbore.

15. The system of claim 13, further comprising:
an acoustic camera on the housing to capture images or video during operation of the laser tool.

16. The system of claim 1, further comprising:
one or more environmental sensors to sense environmental conditions within the wellbore during operation of the laser tool.

17. A system comprising:
multiple laser tools that are connected, each of the multiple laser tools being for use at a different depth within a wellbore formed within a hydrocarbon formation, each of the multiple laser tools comprising:
an optical assembly configured to shape a laser beam for output; and a housing that contains the optical assembly, the housing comprising a side output port disposed within a side surface of the housing, the side output port comprising a fiber optic medium for transmitting the laser beam from inside the housing to outside the housing, the housing further comprising a bottom output port disposed within a bottom surface of the housing and configured to output the laser beam, the housing being configured for movement to direct the laser beam within the wellbore, the movement comprising rotation of the housing around a longitudinal axis of the housing and tilting the housing relative to the longitudinal axis; and
a control system to control movement of each housing of the multiple laser tools, where the multiple laser tools cut through one or more structures of the wellbore via both sublimation and spallation.

18. The system of claim 17, where at least one laser tool of the multiple laser tools comprises a laser beam with a diameter that is within a range of 0.25 inches (6.35 millimeters (mm)) to 2.0 inches (50.8 mm).

19. The system of claim 1, where operation of the optical assembly comprises operation in both a spinning mode and a drilling mode; and
where the laser beam exits the bottom port only during the drilling mode, and exits the side port only during the spinning mode.

20. The system of claim 19, where a partial rotation of the laser tool around the longitudinal axis shapes walls of the wellbore by the laser beam via the side output port resulting in one or more enlarged regions, where the one or more enlarged regions do not extend around the entire circumference of the wellbore.

21. The system of claim 17, where the multiple laser tools are configured to heat the hydrocarbon formation to a first temperature range from 300 degrees C. and to 575 degrees C. corresponding to a spallation temperature of the hydrocarbon formation.

22. The system of claim 21, where the multiple laser tools are configured to heat the hydrocarbon formation to a second temperature range greater than 1100 degrees C. corresponding to a sublimation temperature of the hydrocarbon formation.

* * * * *